(12) United States Patent
Kerr et al.

(10) Patent No.: US 12,244,639 B2
(45) Date of Patent: *Mar. 4, 2025

(54) NETWORK BASED HYPERLOCAL AUTHENTICATION

(71) Applicant: LOYALTY IOT, INC., Reno, NV (US)

(72) Inventors: Michael A. Kerr, Reno, NV (US); Jesus P. Espinoza, Las Vegas, NV (US)

(73) Assignee: LOYALTY IOT, INC., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,477

(22) Filed: Jan. 2, 2024

(65) Prior Publication Data
US 2024/0214415 A1    Jun. 27, 2024

Related U.S. Application Data

(63) Continuation of application No. 18/100,460, filed on Jan. 23, 2023, now Pat. No. 11,876,830, which is a
(Continued)

(51) Int. Cl.
*H04L 9/40* (2022.01)
*H04L 65/102* (2022.01)
*H04L 67/55* (2022.01)

(52) U.S. Cl.
CPC ........ *H04L 63/145* (2013.01); *H04L 63/0421* (2013.01); *H04L 63/0876* (2013.01);
(Continued)

(58) Field of Classification Search
CPC ............... H04L 63/145; H04L 63/0421; H04L 63/0876; H04L 63/1416; H04L 63/20;
(Continued)

(56) References Cited

U.S. PATENT DOCUMENTS 5,761,647 A    6/1998 Boushy
5,768,382 A    6/1998 Schneier et al.
(Continued)

OTHER PUBLICATIONS

Malik et al., "A Survey of Key Bootstrapping Protocols Based on Public Key Cryptography in the Internet of Things", Feb. 2019, IEEE Access, vol. 7, pp. 27443-27464 (Year: 2019).*
(Continued)

*Primary Examiner* — Kenneth W Chang
(74) *Attorney, Agent, or Firm* — Michael A. Kerr; Kerr IP Group, LLC

(57) ABSTRACT

A network based hyperlocal authentication system and method is described. A wireless client device requests a key from a remote network component. The remote network component generates and transmits the key to the gateway. The gateway then transmits the key to the client device application with a gateway short-range transceiver. The wireless client device receives the key from the gateway and then requests and receives a cryptographic material from the remote network component. The wireless client device communicates with the remote network component with the key, received from the gateway, and the cryptographic material, received from the network component.

20 Claims, 25 Drawing Sheets

Related U.S. Application Data continuation of application No. 17/208,801, filed on Mar. 22, 2021, now Pat. No. 11,570,205.

(60) Provisional application No. 62/992,888, filed on Mar. 20, 2020, provisional application No. 62/992,887, filed on Mar. 20, 2020, provisional application No. 62/992,886, filed on Mar. 20, 2020.

(52) U.S. Cl.
CPC .......... *H04L 63/1416* (2013.01); *H04L 63/20* (2013.01); *H04L 65/102* (2013.01); *H04L 67/55* (2022.05)

(58) Field of Classification Search
CPC ..... H04L 65/102; H04L 67/55; H04L 63/061; H04L 63/107; H04L 65/1033; H04L 65/1069; H04W 12/47
See application file for complete search history.

(56) References Cited

U.S. PATENT DOCUMENTS

| | | | |
|---|---|---|---|
| 5,851,149 | A | 12/1998 | Xidos et al. |
| 6,001,016 | A | 12/1999 | Walker et al. |
| 6,230,205 | B1 | 5/2001 | Garrity et al. |
| 6,508,709 | B1 | 1/2003 | Karmarkar |
| 6,640,218 | B1 | 10/2003 | Golding et al. |
| 6,709,333 | B1 | 3/2004 | Bradford et al. |
| 6,719,631 | B1 | 4/2004 | Tulley et al. |
| 6,751,732 | B2 | 6/2004 | Strobel et al. |
| 6,875,110 | B1 | 4/2005 | Crumby |
| 7,830,250 | B2 | 11/2010 | Huseth et al. |
| 8,509,442 | B2 | 8/2013 | Gavette |
| 8,738,024 | B1 | 5/2014 | Kerr et al. |
| 2001/0044337 | A1 | 11/2001 | Rowe et al. |
| 2002/0142844 | A1 | 10/2002 | Kerr |
| 2002/0142846 | A1 | 10/2002 | Paulsen |
| 2002/0198775 | A1 | 12/2002 | Ryan |
| 2003/0036425 | A1 | 2/2003 | Kaminkow et al. |
| 2004/0023721 | A1 | 2/2004 | Giobbi |
| 2004/0255137 | A1 | 12/2004 | Ying |
| 2005/0076210 | A1 | 4/2005 | Thomas et al. |
| 2005/0085257 | A1 | 4/2005 | Laird et al. |
| 2005/0152305 | A1 | 7/2005 | Ji et al. |
| 2005/0215233 | A1 | 9/2005 | Perera et al. |
| 2005/0226423 | A1 | 10/2005 | Li et al. |
| 2005/0261063 | A1 | 11/2005 | Boyd et al. |
| 2006/0046709 | A1 | 3/2006 | Krumm et al. |
| 2006/0125693 | A1 | 6/2006 | Recker |
| 2006/0136742 | A1 | 6/2006 | Giobbi |
| 2006/0189382 | A1 | 8/2006 | Muir et al. |
| 2006/0194633 | A1 | 8/2006 | Paulsen |
| 2006/0287810 | A1 | 12/2006 | Sadri et al. |
| 2006/0287813 | A1 | 12/2006 | Quigley |
| 2007/0060306 | A1 | 3/2007 | Amaitis et al. |
| 2007/0100963 | A1 | 5/2007 | Ban et al. |
| 2007/0136132 | A1 | 6/2007 | Weiser et al. |
| 2007/0167210 | A1 | 7/2007 | Kelly et al. |
| 2007/0281692 | A1 | 12/2007 | Bucher et al. |
| 2007/0286369 | A1 | 12/2007 | Gutt et al. |
| 2008/0057894 | A1 | 3/2008 | Aleksic et al. |
| 2008/0064492 | A1 | 3/2008 | Oosthoek |
| 2008/0113785 | A1 | 5/2008 | Alderucci et al. |
| 2008/0153515 | A1 | 6/2008 | Mock et al. |
| 2008/0207296 | A1 | 8/2008 | Lutnick et al. |
| 2008/0249833 | A1 | 10/2008 | Ali et al. |
| 2008/0263647 | A1 | 10/2008 | Barnett et al. |
| 2009/0070859 | A1 | 3/2009 | Mathur et al. |
| 2009/0170614 | A1 | 7/2009 | Herrmann et al. |
| 2009/0197684 | A1 | 8/2009 | Arezina et al. |
| 2009/0254824 | A1 | 10/2009 | Singh |
| 2010/0022308 | A1 | 1/2010 | Hartmann et al. |
| 2010/0048242 | A1 | 2/2010 | Rhoads et al. |
| 2010/0211431 | A1 | 8/2010 | Lutnick et al. |
| 2010/0250939 | A1 | 9/2010 | Adams et al. |
| 2011/0078167 | A1 | 3/2011 | Sundaresan et al. |
| 2011/0200026 | A1 | 8/2011 | Ji et al. |
| 2013/0073852 | A1* | 3/2013 | Oba ............... H04W 12/106 713/168 |
| 2013/0104204 | A1 | 4/2013 | Henry et al. |
| 2014/0295944 | A1 | 10/2014 | Faircloth |
| 2014/0310513 | A1 | 10/2014 | Barney et al. |
| 2015/0134949 | A1 | 5/2015 | Baldwin |
| 2016/0344549 | A1* | 11/2016 | Campagna ............ G06F 21/602 |
| 2017/0006122 | A1* | 1/2017 | van Gent ................ H04L 51/56 |
| 2017/0178157 | A1 | 6/2017 | Jayaram |
| 2017/0272944 | A1* | 9/2017 | Link, II ................ H04L 9/0841 |
| 2017/0317981 | A1 | 11/2017 | Klein |
| 2019/0098494 | A1* | 3/2019 | Pry ................... H04W 12/0471 |

OTHER PUBLICATIONS

Advanced Encryption Standard (AES), Federal Information Processing Standards (FIPS) Publication 197, Nov. 16, 2001.

Chen et al., "SSL/TLS-based Secure Tunnel Gateway System Design and Implementation", Apr. 2007, International Workshop on Anti-Counterfeiting, Security and Identification, pp. 258-261 (Year: 2007).

GIOBBI/Proxsense, Co-pending U.S. Appl. No. 60/865,596, filed on Nov. 13, 2006, p. 3.

* cited by examiner

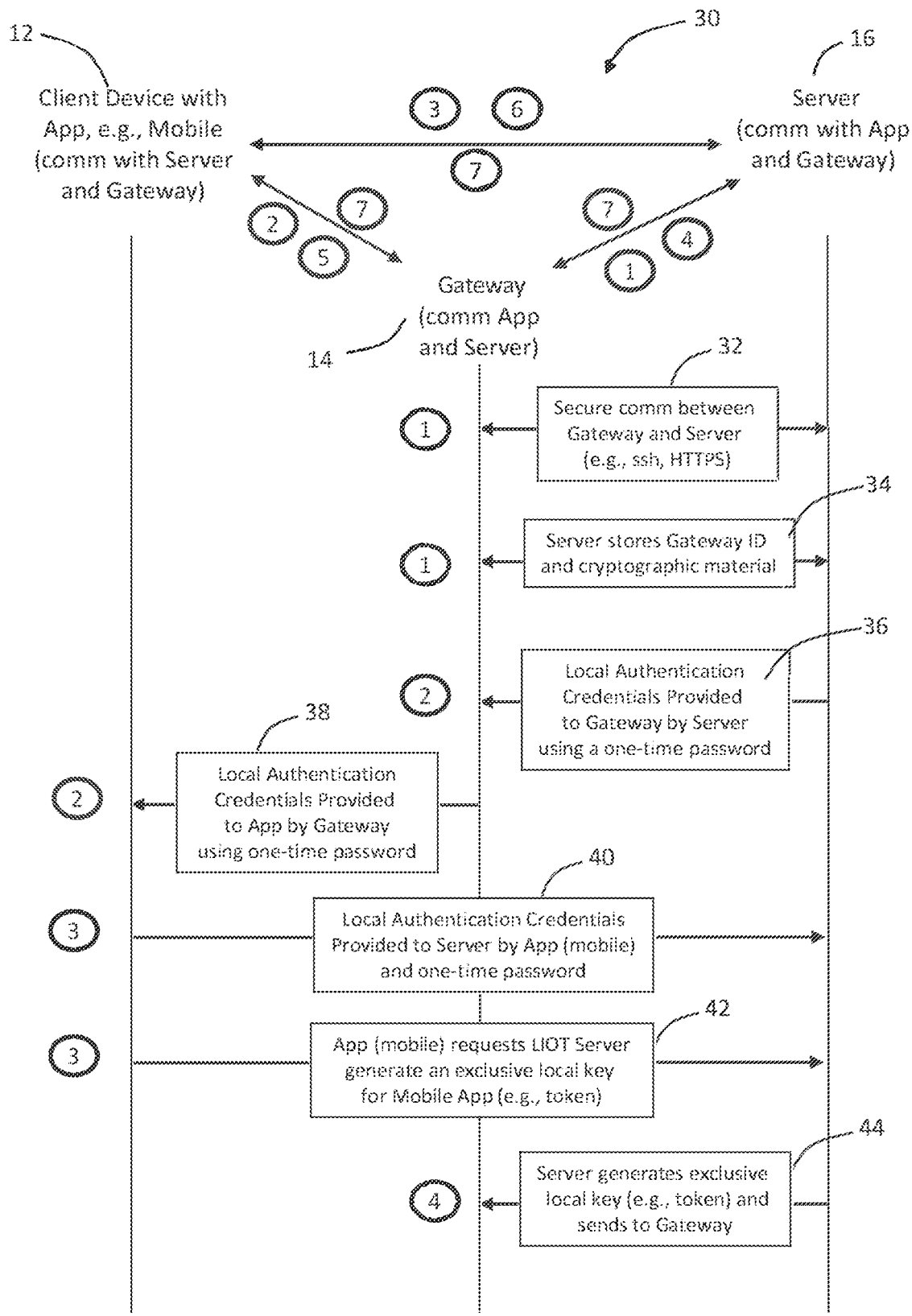
Figure 1C (SIG Protocol)

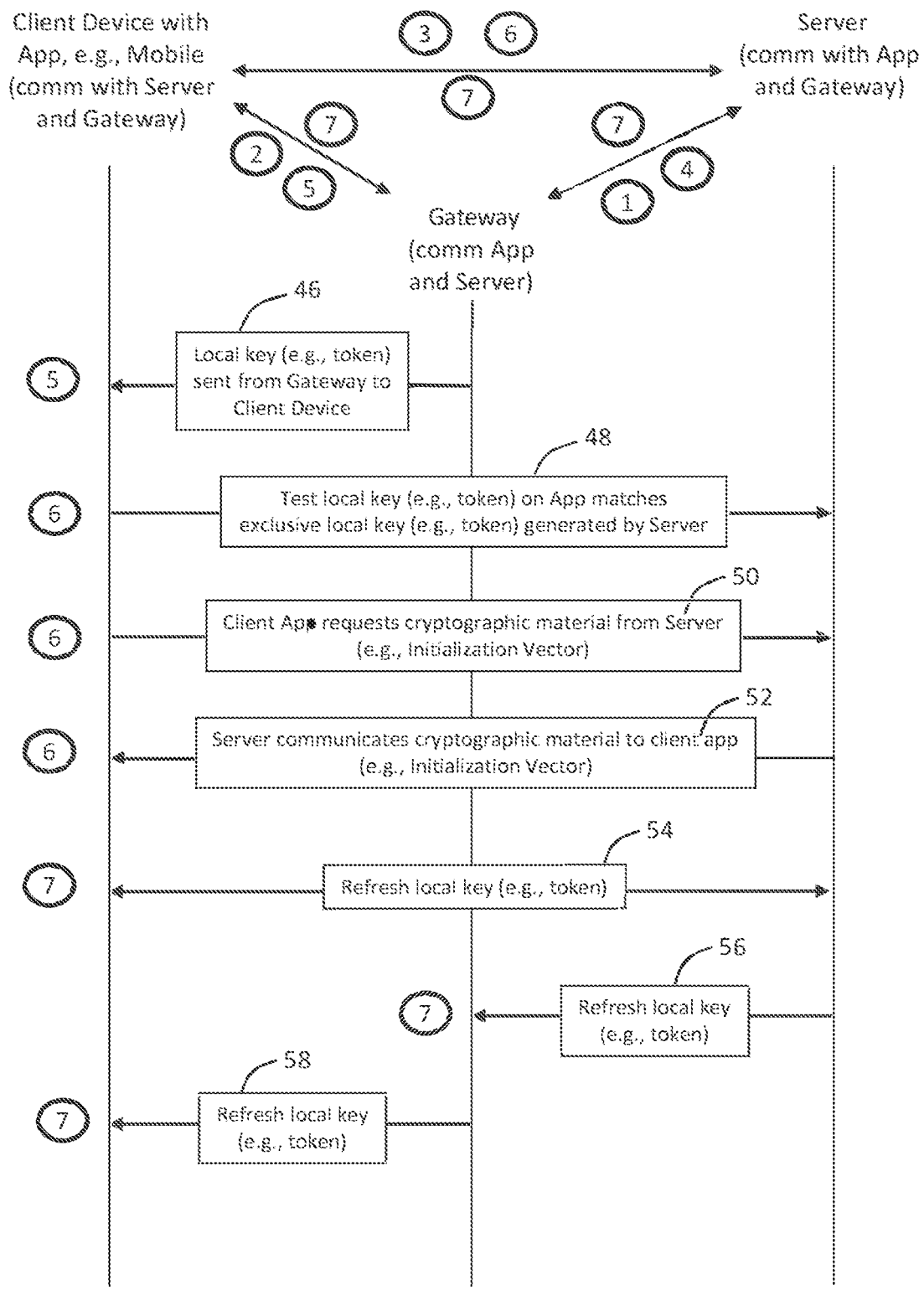
Figure 1D (SIG Protocol)

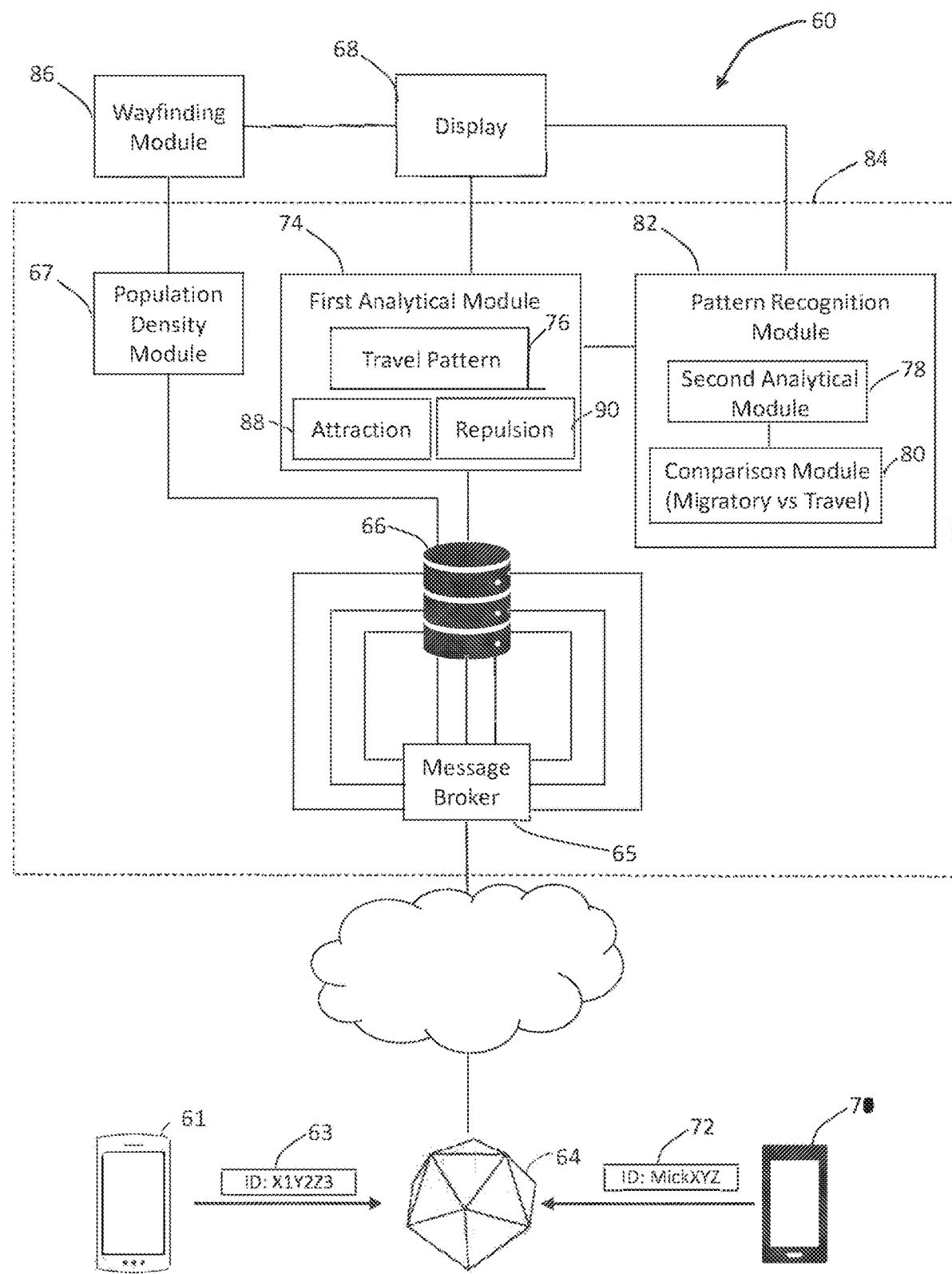
Figure 1E (Services)

NETWORK BASED HYPERLOCAL AUTHENTICATION

CROSS REFERENCE

This patent application is a continuation of patent application Ser. No. 18/100,460 filed on Jan. 23, 2023 entitled NETWORK BASED HYPERLOCAL AUTHENTICATION;

which is a continuation of patent application Ser. No. 17/208,801 filed on Mar. 22, 2021 entitled ANONYMOUS CONTACT TRACING WITH NETWORK BASED HYPERLOCAL AUTHENTICATION;

which claims the benefit of provisional patent application 62/992,886 filed on Mar. 20, 2020 and entitled SOCIAL DISTANCING BY MONITORING POPULATION DENSITIES;

which also claims the benefit of provisional patent application 62/992,887 filed on Mar. 20, 2020 and entitled ANONYMOUSLY TRACKING RF TRANSMISSIONS FROM WIRELESS DEVICES;

which further claims the benefit of provisional patent application 62/992,888 filed on Mar. 20, 2020 and entitled EVENT BASED A/B TESTING; and all of these patent applications are hereby incorporated by reference.

FIELD

A network based hyperlocal authentication system and method is described. After establishing communications between a gateway and a remote network component and between a wireless client device and the remote network component, the wireless client device requests an exclusive local key from the remote network component. The wireless client device receives the exclusive local key via a gateway short-range transceiver. Once the wireless client device has the exclusive local key, the wireless client device requests and receives a cryptographic material from the remote network component. The wireless client device securely communicates with the remote network component with the exclusive local key, received from the gateway short range channel, and the cryptographic material received from the network component.

BACKGROUND

"Social distancing" is a term applied to certain actions taken by public health officials to stop or slow down the spread of a highly contagious disease, e.g., COVID-19. Social distancing measures restrict when and where people can gather to stop or slow the spread of infectious diseases. Social distancing measures include limiting large groups of people coming together, closing buildings, and canceling events.

One of the most common technologies for social distancing is a downloadable mobile application that operates using the Decentralized Privacy Preserving Proximity Tracing (DP3T) protocol. The DP3T protocol is an open protocol that facilitates digital contact tracing. The DP3T protocol uses Bluetooth Low Energy (BLE) to track and log encounters with other users. The DP3T protocol uses Ephemeral IDs (EphID), which are semi-random rotating strings, to uniquely identify clients. When two smartphones encounter each other, they exchange EphIDs and store them locally in a contact log. When a user tests positive for infection, a report is sent to a central server. Each smartphone on the network then collects the reports from the server and independently checks their local contact logs for an EphID contained in the report. If a matching EphID is found, then the user has come in close contact with an infected patient and is warned about the potentially infectious interaction. Contact logs are never transmitted to third parties, and the central reporting server cannot determine the identity of any smartphone in the network.

A competing protocol is the Pan-European Privacy-Preserving Proximity Tracing (PEPP-PT). The PEPP-PT protocol uses a centralized reporting server to process contact logs and individually notifies clients of potential contact with an infected patient. While users are not expected to register with their real name, the back-end server processes pseudonymous personal data that may be used to identify the user.

In April 2020, Apple and Google began working on the Exposure Notification project, which operated using the same principles as the DP3T protocol. Regretfully, while the largest smartphone manufacturers were willing to work together, contact tracing mobile applications have been largely rejected by Americans.

A key reason for this failure is that individuals do not trust the tech companies or the government to collect, use, and store their personal data, especially when that data involves their health and location. Thus, even though the tech giants promised to build various privacy measures such as anonymity and storage of data only on a user's device (DP3T protocol), most smartphone users were not persuaded. A Washington Post survey in April 2020 found that 50% of smartphone users would not use a contact-tracing app even if it promised to rely on anonymous tracking and reporting, and 56% of smartphone users would not trust the big tech companies to keep the data anonymous. By June 2020, 71% of respondents would not use contact tracing apps because of privacy concerns.

These privacy concerns are supported by data breaches and privacy abuses by tech companies, e.g., Facebook and Cambridge Analytica, and government interactions with tech companies.

Also, there are no privacy laws that require that all data collected through COVID tracing apps must be stored and transmitted securely, used only for the purpose of tracking COVID, and disposed of securely when no longer needed for this purpose. Without such protections, there is no assurance that this sensitive data will not be used by insurance companies, employers, and creditors to harm or discriminate against individuals.

Thus, there is a need for an anonymous contact tracing mobile application that protects user privacy and that can be trusted by users and which does not collect, use, and store personal data.

SUMMARY

A network based hyperlocal authentication system and method of securing communications between a wireless client device and a remote network component is described. The system includes a gateway that includes a gateway short-range wireless transceiver. A client device application, corresponding to the wireless client device having a client device short-range wireless transceiver, receives authentication credentials from the network component. The client device application requests a key from the remote network component. The remote network component generates the key for the wireless client device and transmits the key to the gateway. The gateway transmits the key to the client device application with the gateway short-range wireless transceiver. The client device application, having the key, requests a cryptographic material from the remote network component, and the client device application receives the cryptographic material from the remote network component. The client device application communicates with the remote network component with the key received from the gateway and the cryptographic material received from the network component.

In one embodiment, the gateway includes a scanner that detects one or more client device identifiers and a signal strength for each client device identifier. In another embodiment, the network component includes a database that receives a plurality of RF emissions data from the gateway. In an even further embodiment, the remote network component is communicatively coupled to each gateway with at least one of a Wide Area Network (WAN) or Local Area Network (LAN).

In a further embodiment, the gateway short-range wireless transceiver and the client device short-range wireless transceiver include a Bluetooth transceiver. In another embodiment, the gateway short-range wireless transceiver and the client device short-range wireless transceiver include a Wi-Fi transceiver.

In yet another embodiment, the network based hyperlocal authentication system includes a message broker associated with the network component, in which the message broker communicates with gateways and wireless client devices.

In a still further embodiment, the key is continuously refreshed by the network component and communicated via the gateway to the wireless client device, when the client device application communicates with the remote network component.

A network based hyperlocal authentication method of securing communications between a wireless client device and a remote network component is also described. In the method a gateway that includes a gateway short-range transceiver receives authentication credentials from the remote network component. Then the wireless client device receives authentication credentials from the network component. The wireless client device includes a client device short-range wireless transceiver.

The method continues with the wireless client device then requesting a key from the remote network component. The remote network component generates the key for the wireless client device and transmits the key to the gateway. The gateway receives the key from the remote network component and transmits the key to the wireless client device application with the gateway short-range wireless transmitter. The wireless client device requests a cryptographic material from the remote network component and receives the cryptographic material from the remote network component. The wireless client device communicates with the remote network component using the key received from the gateway and the cryptographic material received from the network component.

BRIEF DESCRIPTION OF THE DRAWINGS

The present subject matter will be more fully understood by reference to the following drawings, which are presented for illustrative, not limiting, purposes.

FIG. 1C shows the process steps of the Secure Indoor Geofence (SIG) Protocol, which is associated with the NBHA system.

FIG. 1D shows additional process steps associated with the SIG Protocol.

FIG. 1E shows another illustrative system for social distancing that monitors population densities that is also supported by the NBHA system.

DESCRIPTION

Figure 1A:
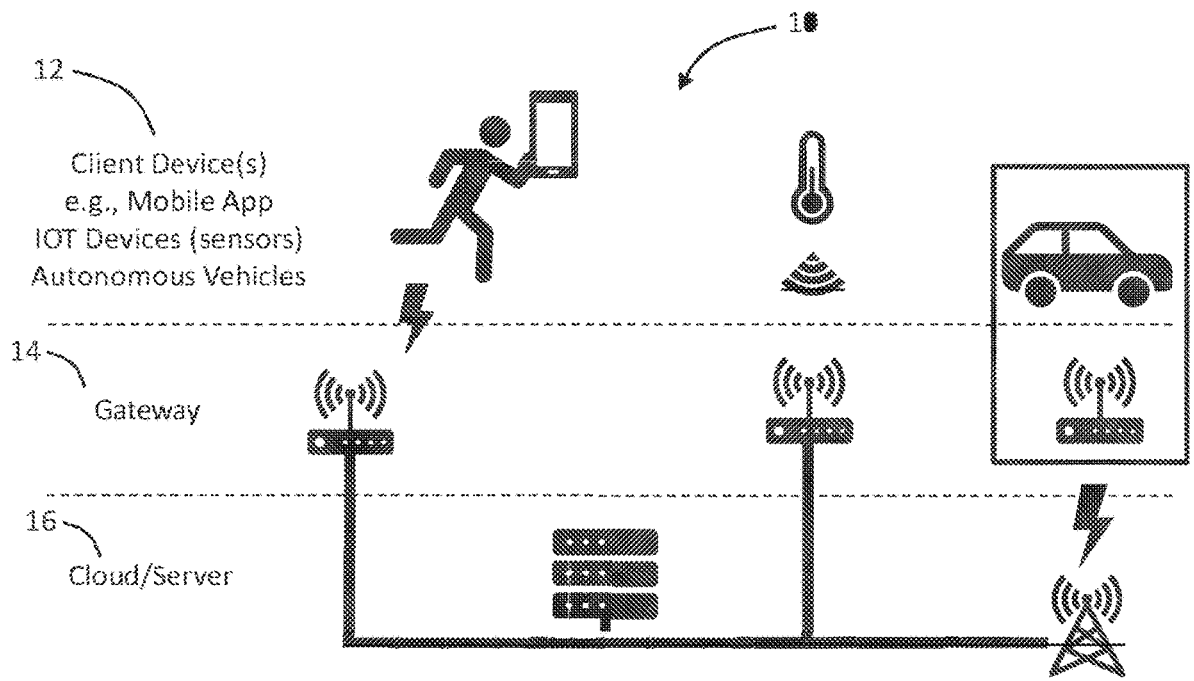
FIG. 1A shows the elements of a Network Based Hyperlocal Authentication (NBHA) system that includes a remote network component (e.g., server), a gateway, and a client device executing a client device application.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. Additionally, the systems and methods may vary as to details, order of the actions, or other variations without departing from the illustrative methods disclosed herein.

A Network Based Hyperlocal Authentication (NBHA) system and method that is passwordless and provides a continuous background authentication and encryption system is described herein. "Passwordless" is defined as the seamless authentication of devices with a secure, convenient, and efficient proof-of-work from the user. The NBHA system and method provide continuous background authentication and a peer-to-peer encryption system.

The NBHA system and method satisfies two core requirements, namely, protecting user privacy and protecting a corporation's trade secrets. The NBHA system includes three hardware elements: a network component (e.g., server), a gateway, and a mobile application that is executed on a mobile device. The NBHA system and method authenticates (verifies) and encrypts communications using a Secure Indoor Geofence (SIG) protocol. The combination of the NBHA system and SIG Protocol produce a passwordless authentication process, which dynamically and automatically establishes a strong password in the background to protect users' privacy and corporate trade secrets.

Once the NBHA system and SIG Protocol are operational, they can continue to operate in the background so that users can interact securely with a mobile application or a desktop application. Thus, the NBHA system and SIG Protocol can be easily integrated with existing applications. Again, the NBHA system and SIG Protocol support continuous passwordless authentication and cryptographic operations that are occurring as a background process.

For illustrative purposes, a variety of different use cases are presented that meet the criteria of protecting user privacy and protecting company/military trade secrets. Significant emphasis is placed on a contact tracing mobile application because user privacy concerns have proven to be quite challenging, as described above. By way of example and not of limitation, other use cases are also presented throughout this patent.

In general, the NBHA system and SIG Protocol satisfies the criteria of protecting user privacy by relying substantially on location based authentication instead of the typical user registration process that requires a username and a password. Simply put, if the user is not in proximity to the gateway, the user can not be tracked. If the user is within proximity to the gateway and initiates communications with the NBHA system using the SIG Protocol, the client device is authenticated without the need for a username and password. Thus, the user is not tracked; however, the user's mobile device operating an executable mobile application is tracked by the NBHA system.

With respect to the protection of company trade secrets, the NBHA system and SIG Protocol control and manage access to company trade secrets by requiring the user to be in proximity of a gateway using location based authentication to verify that the client device is a trustworthy device. Additionally, the cryptographic materials used to authenticate the client application executed on the client device are used to encrypt communications with other network components such as servers, network appliances, and other such network components. Also, the NBHA system and SIG Protocol operate as a background process, so the user does not have direct control of the NBHA system.

Referring to FIG. 1A, there are shown the elements of a Network Based Hyperlocal Authentication (NBHA) system that includes a remote network component (e.g., server), a gateway, and a client device executing a client device application. The illustrative NBHA system 10 components include a client device 12 capable of executing a client device application. The client device 12 is configured to communicate with a NBHA gateway 14 using a short-range communication channel such as Bluetooth or Wi-Fi.

The client device 12 is also configured to communicate with a network component 16, e.g., a server, network appliance, cloud component. The client device 12 communicates with the network component 16 using a broadband communications channel such as a 5G wireless communications channel or a DOCSIS/DSL wired communications channel. Note, for purposes of this patent, the term "broadband" applies to a high bandwidth communications channel.

The NBHA gateway 14 is also configured to communicate with the client device 12 using the short-range communications channel, e.g., Bluetooth, and with the illustrative server 16 using the broadband communications channel. And, of course, the illustrative NBHA server component 16 is configured to communicate with both the NBHA gateway 14 and the client device 12.

For the SIG Protocol to operate in an on-line mode, the short-range wireless communications and broadband communications are occurring simultaneously and continuously. When communications along both communications channels are disrupted, then real-time authentication ceases.

In an off-line mode, the NBHA system may be configured to provide access to historical information; however, access privilege to real-time data objects is denied until both communications channels are restored, each of the system elements are authenticated, and the communications channels are secured with the required cryptographic materials.

Figure 1B:
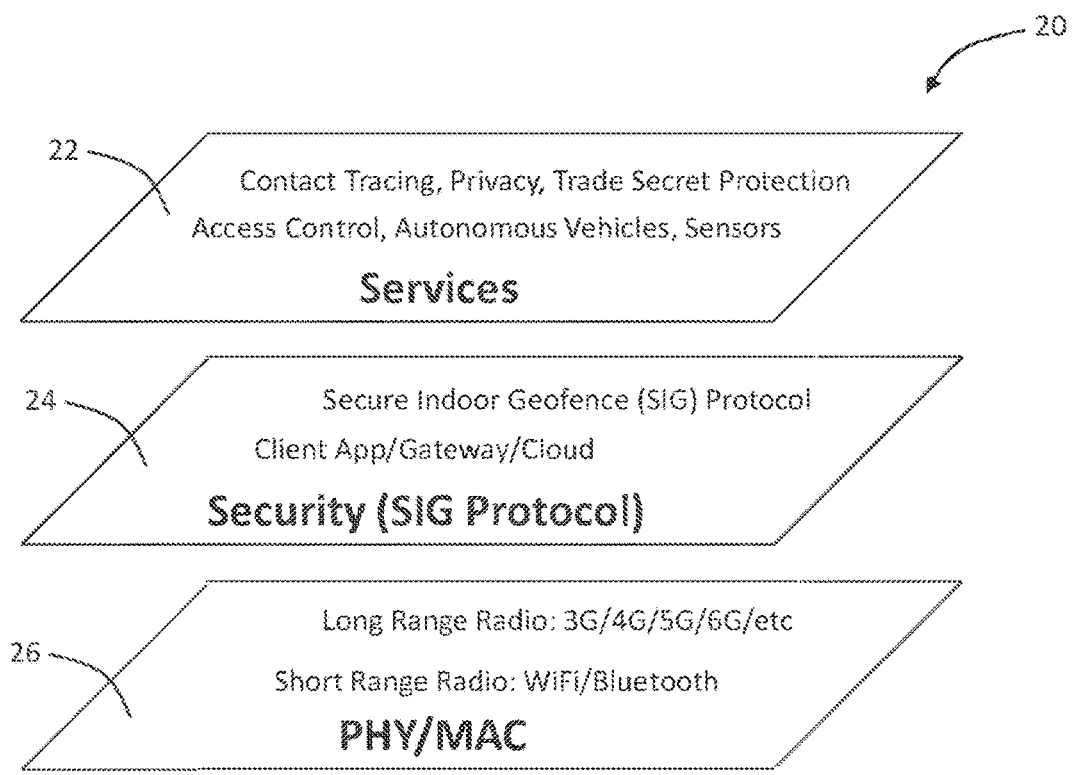
FIG. 1B shows an interconnection model for the NBHA system.

Referring to FIG. 1B, there is shown an interconnection model for the NBHA system. The interconnection model 20 more clearly shows the underlying physical layer and medium access control layer 26 that enables and supports the NBHA system. The SIG Protocol 24 is the communication protocol utilized by the NBHA system to authenticate and secure communications in a passwordless manner.

Various services 22 are supported by the NBHA system 10 operating the SIG Protocol 24 such as anonymous contact tracing, trade secret protection, access control, user privacy in autonomous vehicles, and securing communications with local sensors.

As described in further detail herein, the NBHA system 10 supports the location-based authentication of computing machines and individuals using one-time passcodes or passwords (OTPs) with secret sharing. Location-based one-time passcodes ensure unique registration and authentication based on the physical location of the NBHA gateway, computing machines, and individuals. For anonymity, secret sharing distributes the cryptographic material among the manufacturer, user, device, and database. A "computing machine" is defined as any device capable of render, process, and store data.

The illustrative NBHA gateway also includes a scanner to locate targets and identify rogue devices for military applications, including Force Protection. The NBHA gateway scanner may be a payload attached to an unmanned aerial vehicle for reconnaissance and profiling. The NBHA gateway scanner can also be used to manipulate RF communications in the 2.4 GHz spectrum, specifically Bluetooth Classic and BLE, to negate adverse effects from a rogue device.

The NBHA gateways are configured to operate as a mesh network for the secure delivery of content using location and one-time passcodes. The content includes, but is not limited to, email, dating, social media, news, forums, file sharing, and any media summarized and indexed in a cryptographic hash for media identification and retrieval using distributed media delivery.

Additionally, the NBHA system supports the anonymous tracking of devices for contact tracing and to determine if an individual has been in a restricted area, exposed to a contagious disease, or for biowarfare countermeasures.

Furthermore, the NBHA system can be used for access control to industrial control systems. The NBHA systems may also be used for indoor positioning of devices and/or private content delivery. The NBHA systems may be used for autonomous vehicle passenger verification. The NBHA system may be used as an IoT framework for developers—and executable client applications may be included in an IoT compiler for IoT computing devices, e.g., IoT sensors. The NBHA systems may be used for anonymous location-based gaming activities such as sports betting, real-time side betting, and scavenger games.

The NBHA system may also be used as a hash manager for retrieving data using hexadecimal values. The encrypted hashes are communicated through natural language in 20 Hz-20 KHz audio. The client device receives the encrypted hash using a microphone. The decrypted hash corresponds to a media object (e.g., PII, health information, patents, intellectual property, art, crypto) that needs to be protected and bonded to a geofence. In an alternate embodiment, the frequency of choice is 2.4 GHZ for device-to-device communications.

Further still, the NBHA systems may be used as a pet tracker with access management. Further yet, the NBHA systems can integrate with blockchain and support reliable and secure voting systems on a client device.

Referring to FIG. 1C, there is shown the process steps of the Secure Indoor Geofence (SIG) Protocol, which is associated with the NBHA system. The NBHA method incorporates the NBHA system elements and the SIG Protocol. The method steps of the SIG Protocol are described in FIG. 1C and FIG. 1D.

The SIG Protocol operates as a background process, which is passwordless and continuously authenticates devices and performs cryptographic operations for secure communications between the wireless client device 12 and the remote network component 16. By way of example and not of limitation, the remote network component 16 may be a "server" having a processor and memory. The SIG Protocol method 30 establishes a secure broadband communication channel between the gateway 14 and the remote network component 16 over a Wide Area Network (WAN), e.g., the Internet. In another embodiment, a Local Area Network (LAN) may be used to establish a broadband connection between the gateway 14 and the illustrative server 16.

In one embodiment, the broadband communication channel may be secured with a Hardware Security Module (HSM), which is not shown. In another embodiment, the broadband communication channel may be secured with secure socket layers (SSL) and the HTTPS protocol. Other methods of securing a secure broadband communication channel will readily suggest themselves to those of ordinary skill in the art.

At block 34, the remote network component stores a gateway identifier and cryptographic material associated with securing the broadband communications channel between the gateway 14 and the remote network component 16.

At block 36, the gateway 14 receives authentication credentials from the remote network component 16. By way of example and not of limitation, a one-time password is communicated with the authentication credentials from the remote network component 16 to the gateway 14.

At block 38, the gateway 14, having a short-range wireless transmitter, transmits the authentication credentials and the illustrative one-time password to the wireless client device 12, which has a short-range wireless receiver. A client device application, which is executed on the wireless client device, receives the local authentication credentials from the gateway. In the illustrative embodiment, the short-range wireless transmitter and short-range wireless receiver include a Bluetooth transceiver (not shown). In another embodiment, the one-time password is used as proof-of-work to register a new device. Once a device has been registered, a new one-time password is generated to register another device. Devices never share a one-time password even while performing the same proof-of-work (e.g., simultaneously entering a geofence). As a result, the SIG protocol protects against remote connections, distributed denial of service, and external queries due to the hyperlocal requirements.

At block 40, the client device application operating on wireless client device 12 transmits the local authentication credentials and the illustrative one-time password to the remote network component 16. Additionally, the wireless client device 12 requests an exclusive local key from the remote network component at block 42. In the illustrative embodiment, the exclusive local key is a token.

At block 44, the remote network component 16 generates the illustrative exclusive local key, e.g., the token, and communicates the illustrative token to the gateway 14.

Referring now to FIG. 1D, there are shown additional process steps associated with the SIG Protocol. At block 46, the gateway 14 transmits the exclusive local key, e.g., the token, to the wireless client device application with the gateway short-range wireless transmitter.

At block 48, the exclusive local key, e.g., token, is tested by having the wireless client device 12 submit a challenge to the remote network component 16, which generated the exclusive local key, e.g., token.

At block 50, the client device application, having the exclusive local key, requests a cryptographic material from the remote network component 16. At block 52, the remote network component 16 generates the cryptographic material, which, by way of example and not of limitation, is an initialization vector.

At block 54, the client device application receives the cryptographic material from the remote network component 16 via the broadband communication channel.

The client device application then proceeds to encrypt communications to the remote network component with a shared secret that includes the exclusive local key received from the gateway 14 and the cryptographic material received from the network component 16.

In the illustrative contact tracing mobile application, the client device application gathers contact tracing data and encrypts the contact tracing data with the shared secret, which is then transmitted to the remote network component.

The process of generating the exclusive local key, e.g., token, can be repeated continuously, as shown by blocks 54, 56, and 58. The SIG Protocol operates as a background process according to the technical requirements or business requirements for the specific mobile application, access requirements to the remote network component, regulatory requirements, financial transactional requirements, or other such requirements.

Thus, the passwordless capabilities of the NBHA system are constantly tested and updated in the background and not limited by a single authentication step, which is common with the use of biometrics for passwordless authentication. Additionally, the anonymity of the user is preserved because there is no need for a biometric. Instead, the client device is tracked for purposes of implementing the SIG protocol.

With respect to the illustrative contact tracing mobile application, an infection report is received by an infected client device application. The infection report includes an infection report timestamp. The network component identifies other client devices in proximity to the infected client device. A notification module notifies the other client devices about their proximity to the infected client device with a calculated risk factor.

Referring to FIG. 1E, there is shown an illustrative NBHA system for social distancing that monitors population densities that is also supported by the NBHA systems. Note, the monitoring performed in this embodiment is based on centralized and anonymous tracking of individuals. Thus, elements of the DP3T standard are following for preserving user anonymity, i.e., the individual remains anonymous. However, the NBHA systems centrally determine the location of each client device using network based indoor positioning information that is extracted from the authentication data sets gathered by using the SIG Protocol.

The illustrative NBHA system 60 may also be used to anonymously tracking RF transmissions transmitted by an unregistered wireless device. The illustrative NBHA system 60 may also be used for event-based A/B testing, in which the impact of an event is monitored by tracking captured RF transmissions from registered and unregistered wireless devices.

Event-based A/B testing refers to detecting RF leakage or wireless identifiers from registered and unregistered wireless devices with respect to an event location and event time. A travel pattern or migration pattern for the registered and unregistered wireless device determines an attraction and/or repulsion to the event—and the impact of an event is measured by the attraction and/or repulsion to the event.

The system 60 includes unregistered wireless devices such as illustrative unregistered wireless device 61. Each unregistered wireless device includes a processor, a memory, and each unregistered wireless device transmits at least one wireless device identifier, such as wireless device identifier 63.

The system also includes a plurality of stationary transceivers such as stationary transceiver 64, which is also referred to interchangeably as a "gateway." In the illustrative embodiment, each stationary transceiver is disposed in a fixed location. Additionally, each stationary transceiver includes a scanner that detects at least one wireless device identifier corresponding to each unregistered wireless device. Additionally, the scanner may also detect registered wireless devices. Alternatively, the transceivers may be mobile; however, for purposes of the embodiments presented herein, the transceivers are in a fixed location, i.e., stationary location.

The message broker 65 is communicatively coupled to each of the stationary transceivers including illustrative gateway 64. The message broker 65 receives the illustrative wireless device identifier 63 and associates the wireless device identifier 63 with the stationary transceiver 64 that detects the wireless device identifier 63 at a particular time.

The message broker 65 is communicatively coupled to a database 66, which stores each wireless device identifier recognized by each stationary transceiver. For example, the database 66 stores the location for stationary transceiver 64, the wireless device identifier 63 and the timestamps corresponding to the time the wireless device identifier was detected by the stationary transceiver 64. Additionally, the database 66 stores or generates the period of time the wireless device identifier remained in a particular location. The wireless device identifiers may be associated with unregistered wireless devices and registered wireless devices. For the event-based A/B testing, the database 66 also stores an event location (or area) and an event time—the event time includes the beginning time for the event and the duration of the event.

The population density module 67 is communicatively coupled to the database 66 and receives the illustrative wireless device identifier 63, the locations and timestamps for the wireless device identifier 63. The population density module 67 determines a number of wireless identifiers in a particular area with the wireless identifiers, the timestamps and the locations associated with the illustrative wireless device identifier 63. The wireless device identifier received by the population density module 67 may be associated with an unregistered wireless device or a registered wireless device. The display 68 presents the population densities, determined by the population density module, on a map.

The system includes a plurality of registered wireless devices such as illustrative registered wireless device 70. Each registered wireless includes a processor and a memory. Additionally, each registered wireless device transmits at least one registered wireless device identifier 72 to the stationary transceiver. The illustrative registered wireless device identifier 72 is transmitted to database 66. The database 66 stores the registered wireless identifier 72 and updates the timestamps and location for the registered wireless device identifier 72.

By way of example and not of limitation, the illustrative wireless devices 61 and 70 repeatedly transmit a Bluetooth wireless device identifier. The Bluetooth wireless identifiers 63 and/or 72 are captured by the scanner corresponding to the gateway 64. In operation, the stationary transceiver 64 generates timestamps corresponding to the detection of the Bluetooth wireless device identifiers 63 and/or 72.

Note, the stationary transceiver 64 may also include a camera (not shown) communicatively coupled to a camera-based pattern recognition module (not shown) that counts persons within a camera field of view (not shown).

In still another illustrative embodiment, the system includes a first analytical module 74 that is communicatively coupled to the database 66. The first analytical module 74 generates a travel pattern 76 for each wireless device identifier. The travel pattern 76 indicates the time spent at different locations for each wireless device identifier. The travel pattern associated with one or more wireless device identifiers is presented on display 68. The travel pattern may be generated for registered wireless device identifiers and unregistered wireless device identifiers.

Additionally, the first analytical module 74 includes an attraction indicator 88 that shows one or more wireless device identifiers moving towards the event location during the event time based on the travel pattern corresponding to the wireless device identifier. Additionally, the attraction indicator 88 may be based on travel patterns that occur before the event, during the event and after the event. The repulsion indicator 90 operates in a manner similar to the attraction indicator 88, except the repulsion indicator 90 shows one or more wireless device identifiers moving away from the event location. The display 68 shows at least one of the attraction indicator and the repulsion indicator for each wireless device identifier.

The system 60 also supports generating anonymous user profiles based on anonymous migration patterns. In the illustrative embodiment, anonymous migration patterns that correspond to a particular demographic profile are stored in the database 66. Each anonymous migration pattern associates time spent at different locations with a demographic profile.

A second analytical module 78 that is communicatively coupled to the first analytical module 74 proceeds to compare the travel pattern (associated with a wireless identifier) with the migratory pattern (associated with a demographic profile). The travel pattern 76 is compared with the migratory pattern at the illustrative comparison module 80. If there is a match between the travel pattern (associated with a wireless identifier) and the migratory pattern (associated with a demographic), the wireless identifier is classified as being associated with the demographic profile. By way of example and not of limitation, a wireless identifier may be associated with one or more demographic profiles. The updated migratory patterns are presented on display 68.

The system 60 may also include a pattern recognition module 82 that classifies the wireless device identifier as having a particular demographic profile. The pattern recognition module 82 includes the second analytical module 78 and the comparison module 80. The pattern recognition module 82, more generally, compares the travel pattern for each wireless device identifier with the migration pattern associated with the demographic profile—the output is presented on the display 68. Additionally, the display 68 shows at least one of the attraction indicator and the repulsion indicator for each demographic profile at the event location during the event time.

The system may also include a server module 84 that includes the message broker 65, the database 66, and the population density module 67. Additionally, the server module 84 may also include the first analytical module 74 and the pattern recognition module 82. The server module 84 may be disposed with a local area network (LAN) or may be disposed in a private cloud, public cloud, or hybrid cloud.

In the illustrative embodiment, the display 68 that presents the population density, the travel patterns or the migratory patterns may be presented on a browser that operates on a personal computer, laptop, or other such electronic devices. Additionally, the display 68 may correspond to a mobile device such as a smartphone that includes a smartphone application that can present the population density, the travel patterns or the migratory patterns.

In another illustrative embodiment, the population density module 67 may also generate a virtual queue (not shown) when the number of wireless identifiers in a particular area reaches a threshold. The number of wireless identifiers reaching a threshold triggers the formation of a virtual queue, which includes a physically distributed queue and a notification module that indicates an order in the virtual queue. In a social distancing embodiment, the event is associated with social distancing and the population density module generates a virtual queue when the number of wireless identifiers in a particular area reaches a social distancing threshold, which triggers the formation of a virtual queue.

Furthermore, the population density module 67 may be communicatively coupled to a wayfinding module 84. The population density module 67 identifies locations with high population densities and communicates the location for high population densities to the wayfinding module 86. The wayfinding module 86 interprets the high population density locations as traffic congestion in a particular area—so that the wayfinding module generates one or more routes to minimize exposure to high population density locations.

In still another social distancing embodiment, the event is associated with a positive infection result and the database is configured to be updated when the positive infection test result is reported. The database associates the positive infection test result with a corresponding infected registered wireless device. The notification module notifies other registered wireless devices that were in proximity to the infected registered device, the location and the time that the registered wireless devices were proximate to the infected registered wireless device.

In operation, infection results are reported with the system 60 by updating database 66 when a positive infection test result is reported. The database 66 associates the positive infection test result with an infected registered wireless device identifier 72. The population density module 67 is updated and presents the positive infection result and the population density in real-time or near real-time.

Additionally, the systems and methods presented herein report infection exposure after the infection is detected. In other words, if a healthy person is exposed to an infected person on March 20 and the infection is not detected for five (5) days, i.e., March 25, the healthy person may be notified on March 25 that they were exposed to an infected person on March 20 at a particular time and location and for a particular time period.

In operation, the system 60 reports infection exposure after the infection is detected. The system 60 reports prior exposure to an infected person by having the first analytical module 74 generate the traffic pattern for the infected individuals. The infected individual traffic pattern is then converted to an "infected" demographic profile by the pattern recognition module 82. The pattern recognition module 82 then proceeds to determine if there is a match between the "infected" demographic profile and one or more individual traffic patterns. If there is a match between the infected demographic profile and one or more traffic patterns, then the notification module (not shown) communicates to the affected wireless devices that the wireless device was in proximity to an infected person at a particular time, a particular location and for a particular time period.

Figure 1F:
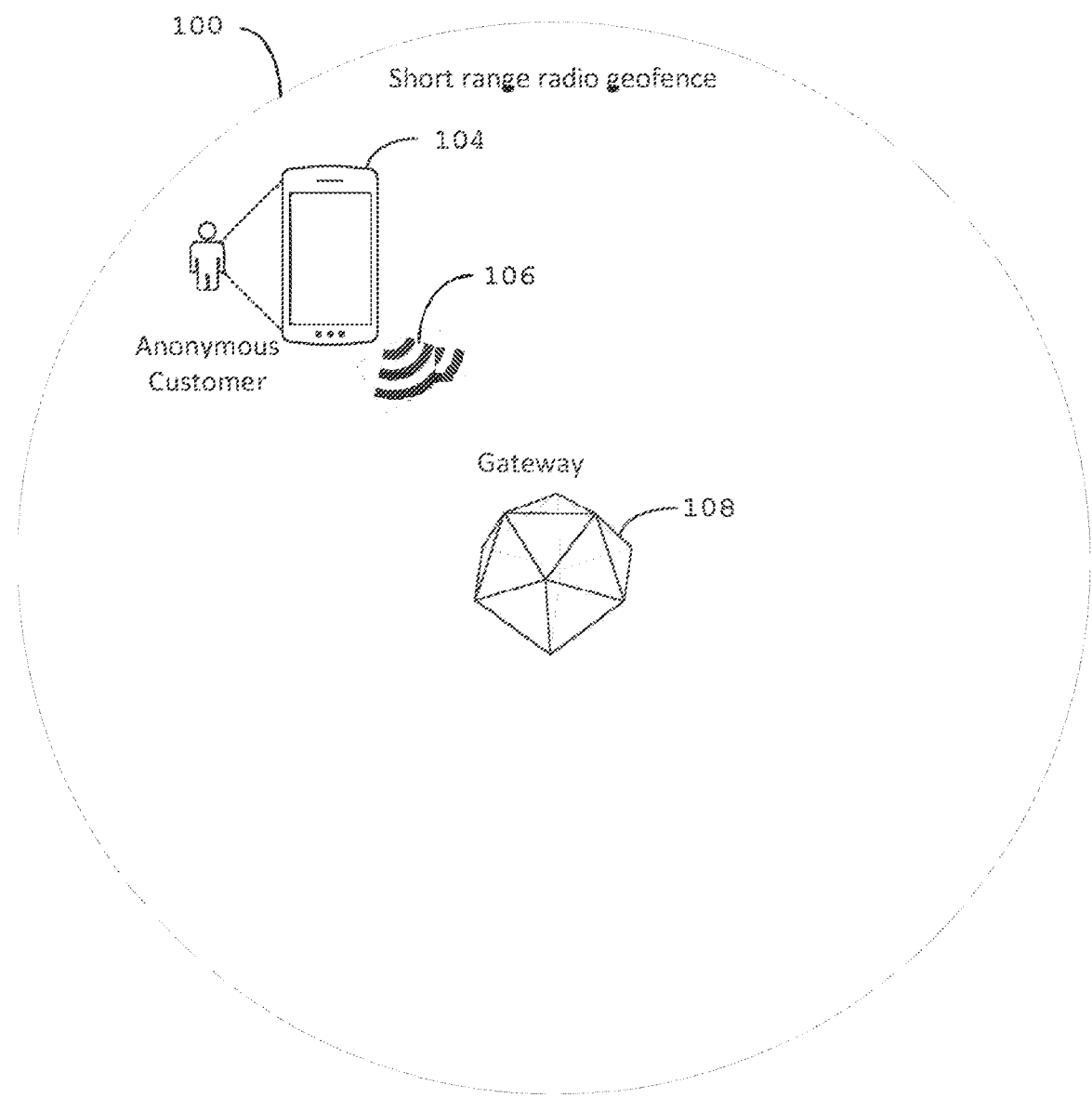
FIG. 1F shows the gateway controlling a short-range radio, which is used to generate a geofence.

Referring to FIG. 1F, there is shown a Network Based Hyperlocal Authentication (NBHA) gateway controlling a short-range radio, which is used to generate a geofence. More specifically, the illustrative NBHA gateway 108 controls a short-range radio geofence 100 for detecting an anonymous wireless device 104 transmitting wireless signals 106.

The illustrative gateway 108 is in a fixed location, i.e., stationary and networked. However, the gateway may also be mobile. By way of example and not of limitation, the mobile gateway may be associated with a mobile application executed on a "smart" watch or in a "smart" vehicle, e.g., an autonomous vehicle. Other illustrative mobile gateway embodiments may include a drone, a robot, or other such mobile devices. More generally, the gateway receives RF emissions from wireless devices capable of executing an application and communicates these received RF emissions to a networked component, e.g., a network storage device that is communicatively coupled to the gateway.

The NBHA gateway, systems and methods described herein operate by gathering "RF emissions," also referred to as "RF leakage," from wireless devices, e.g., smartphones. In the illustrative embodiments presented herein, RF emissions received by the stationary gateway are associated with open network protocols such as Bluetooth Classic and Bluetooth Low Energy. Additionally, the RF emissions may be gathered from Wi-Fi, GSM, LTE, 5G, Near-Field Communication (NFC), Radio-Frequency Identification (RFID), and other such protocols or standards that are used for wireless communications.

Note, the terms "RF emissions" and "RF leakage" are used interchangeably in this patent unless otherwise indicated. More specifically, the term "RF leakage" denotes that RF emissions are gathered anonymously; thus, the term "RF leakage" is associated with anonymous users. The term "RF emissions" is more generic and may be associated with an anonymous user, a registered user, or an anonymous registered user. In an alternative embodiment, the anonymous registered user may be a user that is registered with a false name.

In the illustrative embodiment presented herein, a plurality of the stationary gateways are networked and are associated with an illustrative casino property. The illustrative casino property has at least six different market activities that includes a hotel, food and beverage, entertainment, retail stores, gaming, and security.

RF emissions generated by smartphones are captured by one or more stationary NBHA gateways. The NBHA gateways then communicate the RF emissions to a cloud based storage device via a Wide Area Network such as the Internet. In an alternative embodiment, the NBHA gateways communicate the RF emissions to a local storage device using a Local Area Network (LAN). The cloud based storage device and/or local storage device include a database that is configured to receive the RF emissions data from the stationary gateways.

An analytics module accesses the RF emissions database and generates a variety of different "visualizations" of the RF emissions. In the illustrative embodiment, the visualization generated by the analytics module is presented on a browser that is accessible on a client device such as a laptop, PC, smartphone, tablet, or other such devices.

The NBHA gateway 108 is connected to the network and can receive information from the network. This functionality can be used to do everything from controlling the Bluetooth (BT) transmit power from a central location to increased security of the network based indoor positioning.

The NBHA gateway 108 is unique because it includes a sophisticated Bluetooth scanner that is networked and can be controlled from a centralized NOC (Network Operations Center). Additionally, there are many Bluetooth radios in the NBHA gateway scanner that perform various functions described as follows.

The NBHA gateway is able to control the BT "ping" signal centrally (from the NOC) to determine more accurately the location of the BT devices—because NBHA gateway 108 triggers a user device "pong" or acknowledgment (ACK). Additionally, the NBHA gateway can extract the unique identifier with the NBHA Bluetooth scanner. Furthermore, the NBHA gateway can perform security functions and detect rogue devices.

Note, anonymous user profiles can be developed with the NBHA gateways. The anonymous user profiles can be developed by collecting adequately accurate location data and associating time with the adequately accurate location data. Thus, an anonymous user can be characterized based on the person's particular movement in various localized areas and the amount of time they spend in these particular areas. For example, a person may be labeled a "foodie" if they spend most of their time in restaurants. If a person spends most of their time in the table games section of a casino property, the person may be classified as a "table game player." The location accuracy has to be good enough, i.e., adequate, to support classifying the anonymous user.

Real-time event-based A/B testing can also be supported by the NBHA gateways. Real-time event-based testing is supported by measuring the changes in populations in a particular area. Real-time event-based testing operates by identifying an event that has a location and time and then tracking the customer's movement (or lack of movement) before the event, during the event, and after the event.

Discrete time intervals can be used to monitor for changes in the customer's movement so that real-time customer feedback regarding the event can be received without a customer survey or by tracking customer clicks with a downloadable mobile app.

Figure 2:
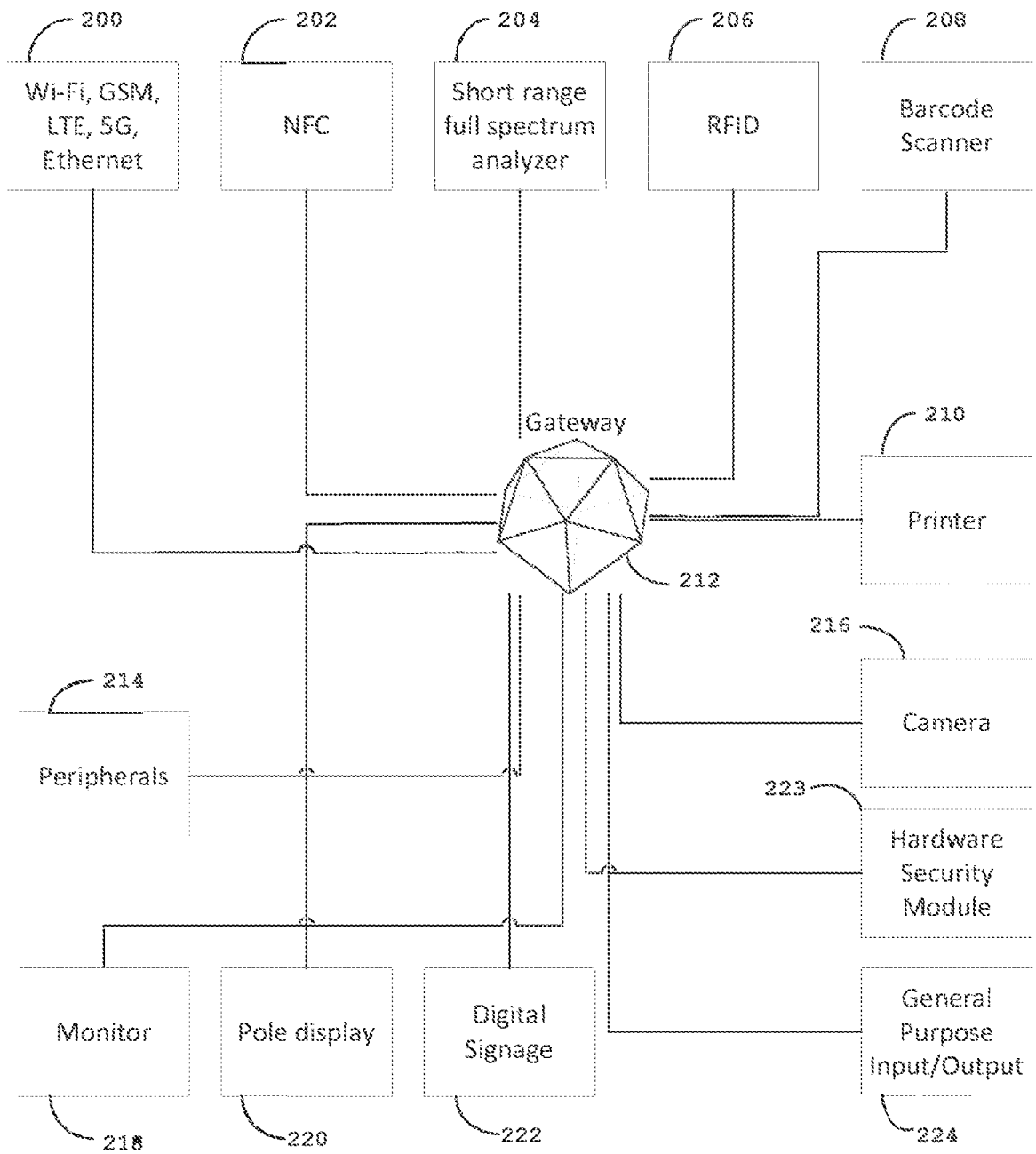
FIG. 2 shows a plurality of interfaces associated with the gateway.

Referring to FIG. 2, there is shown a plurality of interfaces that are communicatively coupled to another illustrative NBHA gateway 212. The interfaces may be associated with short-range transmitters, short-range receivers, short-range transceivers, sensors, and ports, e.g., USB ports.

More specifically, the interfaces for the illustrative NBHA gateway 212 include radios 200 that support communications using various standards such as Wi-Fi, GSM, LTE, 5G, Ethernet 200. Other interfaces include, but are not limited to, a Near-field Communication (NFC) 202, a short-range full spectrum analyzer 204, a Radio-Frequency Identification (RFID) sensor 206, a barcode scanner 208, a printer 210, a camera system 216, peripherals 214, monitor 218, pole display 220, a digital signage interface 222, a Hardware Security Module (HSM) 223 and a general purpose input/output (I/O) interface 224.

The general purpose I/O interface may interface with a microphone, temperature sensor, and various chemical sensors such as gas sensors that detect methane, carbon monoxide, and hydrogen sulfide. The sensors may also operate in the aqueous phase and detect ammonia, oxygen, pH, and other such chemicals.

Figure 3:
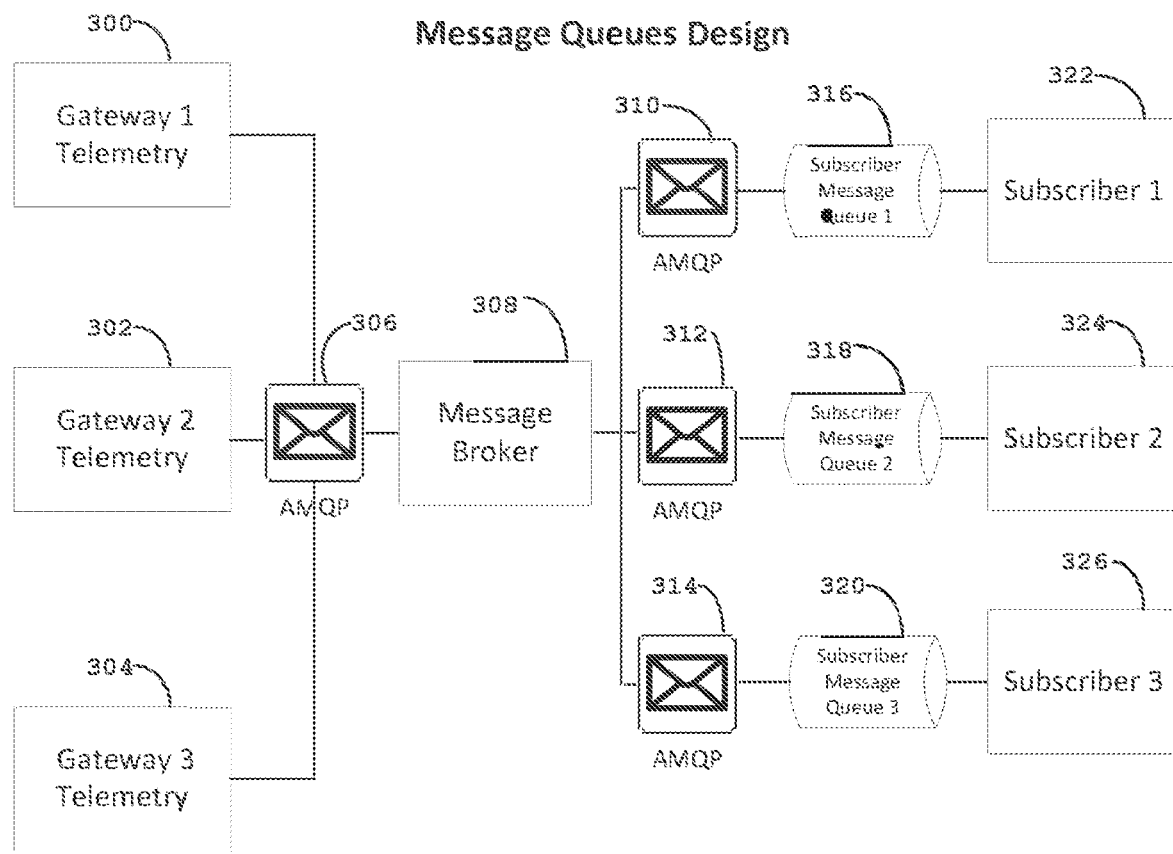
FIG. 3 shows a message queue design for networked gateways.

Referring to FIG. 3, there is shown a message queue design for networked gateways. The illustrative message broker is communicatively coupled to a plurality of NBHA gateways 212. In the illustrative embodiment, NBHA gateways 300, 302, and 304 use message-oriented middleware such as Advanced Message Queuing Protocol (AMQP) 306 and communicate with a message broker 308, an AMPQ 310, an AMPQ 312, and AMPQ 314, a subscriber message queue 1 316, a subscriber message queue 2 318, a subscriber message queue 3 320, and subscriber 1 322, subscriber 2 324, and subscriber 3 326.

Figure 4A:
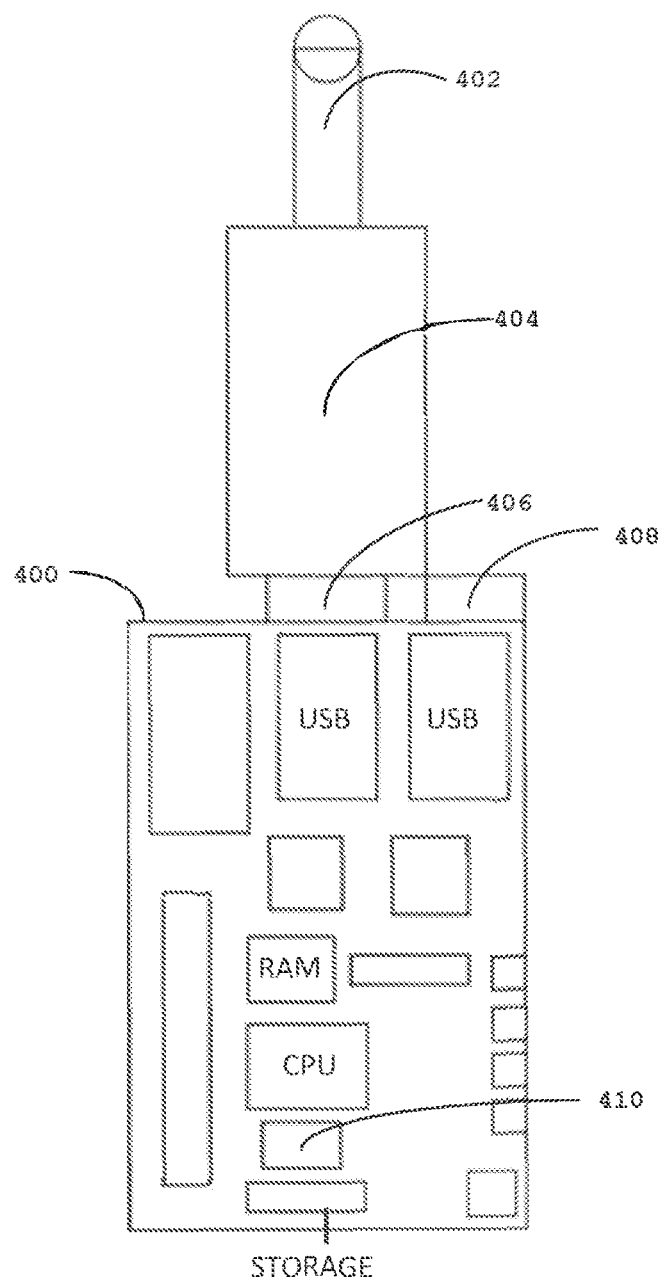
FIG. 4A shows an illustrative gateway.

Referring to FIG. 4A, there is shown an illustrative NBHA gateway that includes a computer board 400 that further includes a CPU, RAM, and storage for code execution. Additionally, the illustrative NBHA gateway includes a first USB dongle 406, a second USB dongle 408, an internal Bluetooth 5.0 module 410, a programmable RF module 404, and an antenna 402.

Figure 4B:
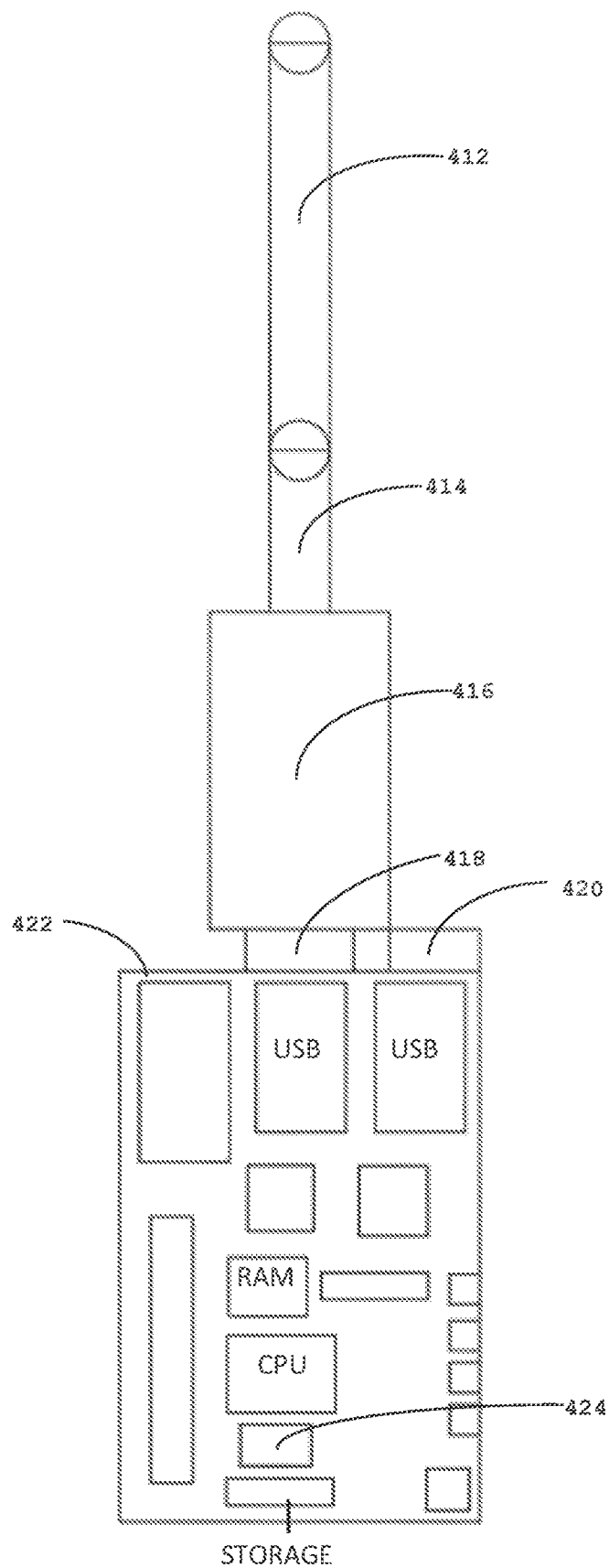
FIG. 4B shows another illustrative gateway with a plurality of sensors and an omnidirectional antenna designed and optimized for 2.4 GHz band applications.

Referring to FIG. 4B, there is shown another illustrative NBHA gateway with a plurality of sensors and an omnidirectional antenna design optimized for 2.4 GHz band applications. The illustrate NBHA gateway includes a computer board 422 having a CPU, RAM, and storage for code execution. Additionally, the Illustrative NBHA gateway includes a USB dongle 418, a USB dongle 420, an internal Bluetooth 5.0 module 424, a programmable RF module 416, and an omnidirectional antenna 412 and 414 that is designed and optimized for 2.4 GHz band applications.

Figure 4C:
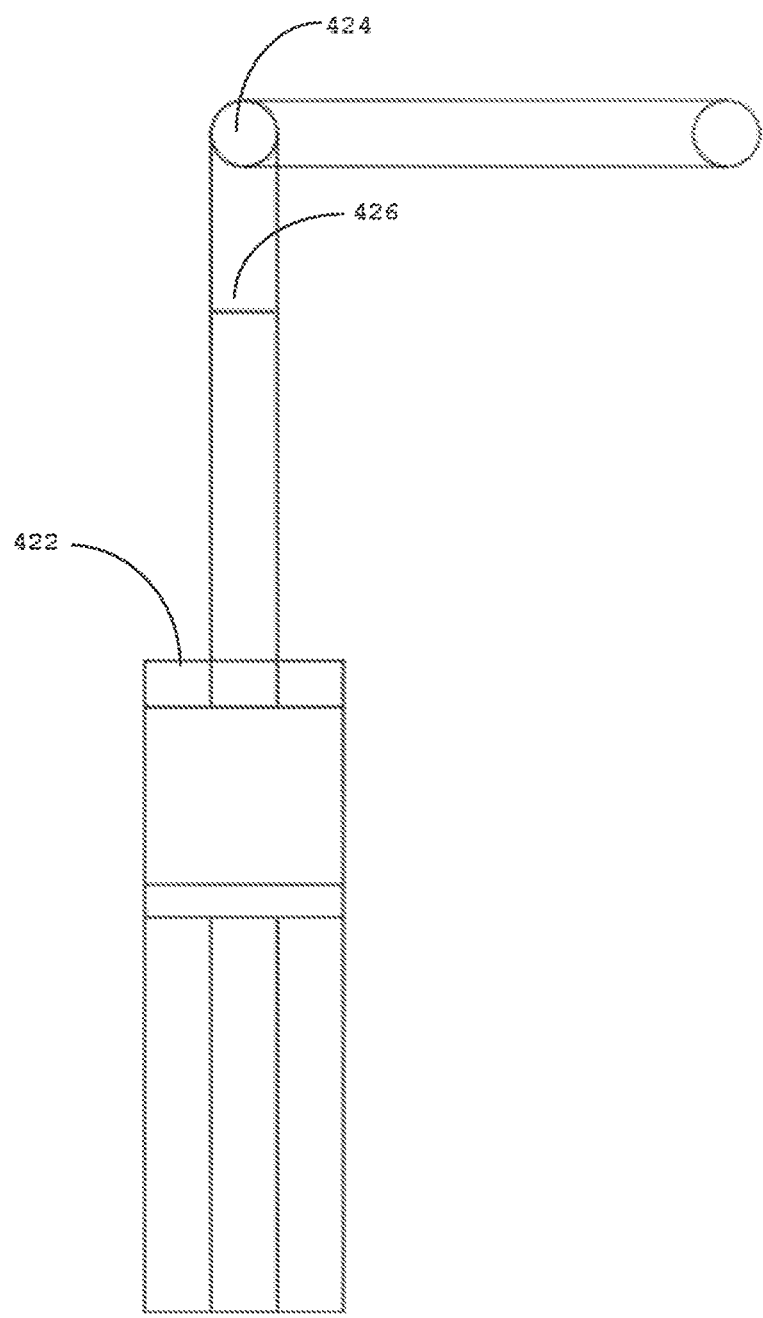
FIG. 4C shows yet another illustrative gateway with a 90-degree tilt and 360-degree swivel.

Referring to FIG. 4C, there is shown yet another illustrative gateway with a 90-degree tilt 324 and 360-degree swivel 426 on an omnidirectional antenna. In an alternate embodiment, the antenna is a directional antenna to narrow the area of effect.

Figure 5A:
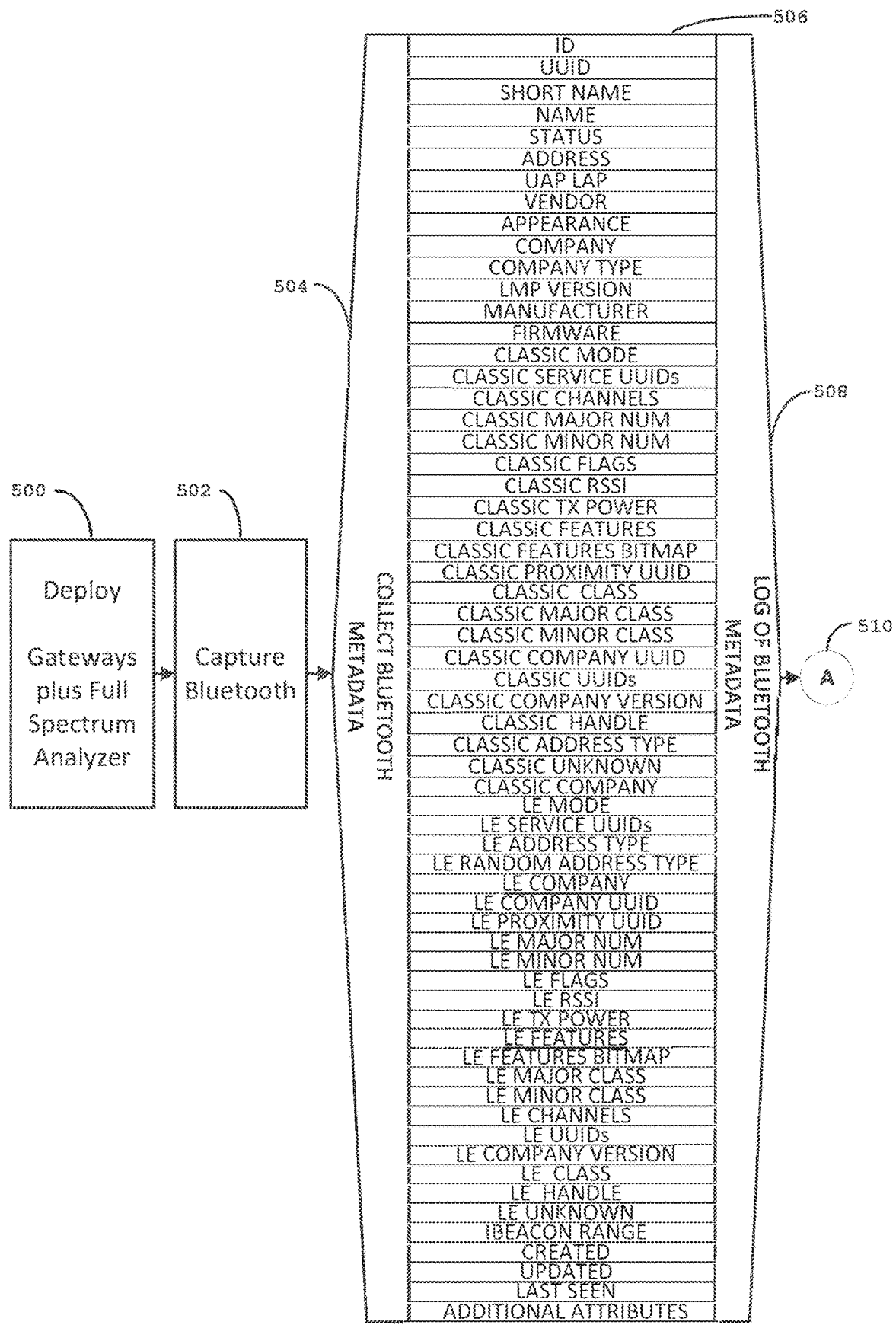
FIG. 5A shows a flowchart that receives Bluetooth classic and Bluetooth Low Energy (BLE) metadata.

Referring to FIG. 5A, there is shown a flowchart that receives Bluetooth classic and Bluetooth Low Energy (BLE) metadata. The flowchart of FIG. 5A shows the metadata handling from Bluetooth classic and Bluetooth low energy devices associated with gateways 500 that include an illustrative scanner such as spectrum analyzer 500 that capture and processes Bluetooth signals 502. The Bluetooth metadata 504 is collected and a list of data types 506 includes ID, UUID, SHORT NAME, NAME, STATUS, ADDRESS, UAP LAP, VENDOR, APPEARANCE, COMPANY, COMPANY TYPE, LMP VERSION, MANUFACTURER, FIRMWARE, CLASSIC MODE, CLASSIC SERVICE UUIDS, CLASSIC CHANNELS, CLASSIC MAJOR NUM, CLASSIC MINOR NUM, CLASSIC FLAGS, CLASSIC RSSI, CLASSIC TX POWER, CLASSIC FEATURES, CLASSIC FEATURES BITMAP, CLASSIC PROXIMITY UUID, CLASSIC CLASS, CLASSIC MAJOR CLASS, CLASSIC MINOR CLASS, CLASSIC COMPANY UUID, CLASSIC UUIDS, CLASSIC COMPANY VERSION, CLASSIC HANDLE, CLASSIC ADDRESS TYPE, CLASSIC UNKNOWN, CLASSIC COMPANY, LE MODE, LE SERVICE UUIDS, LE ADDRESS TYPE, LE RANDOM ADDRESS TYPE, LE COMPANY, LE COMPANY UUIDS, LE ADDRESS TYPE, LE RANDOM ADDRESS TYPE, LE COMPANY, LE COMPANY UUID, LE PROXIMITY UUID, LE MAJOR NUM, LE MINOR NUM, LE FLAGS, LE RSSI, LE TX POWER, LE FEATURES, LE FEATURES BITMAP, LE MAJOR CLASS, LE MINOR CLASS, LE CHANNELS, LE UUIDS, LE COMPANY VERSION, LE CLASS, LE HANDLE, LE UNKNOWN, IBEACON RANGE, CREATED, UPDATED, LAST SEEN, and ADDITIONAL ATTRIBUTES. By way of example and not of limitation, an illustrative Bluetooth spectrum analyzer is an Ubertooth One, which can also be used to generate a process log of Bluetooth metadata 508. The illustrative flowchart in FIG. 5A is associate with FIG. 5B via connector symbol A 510 and A 528.

Figure 5B:
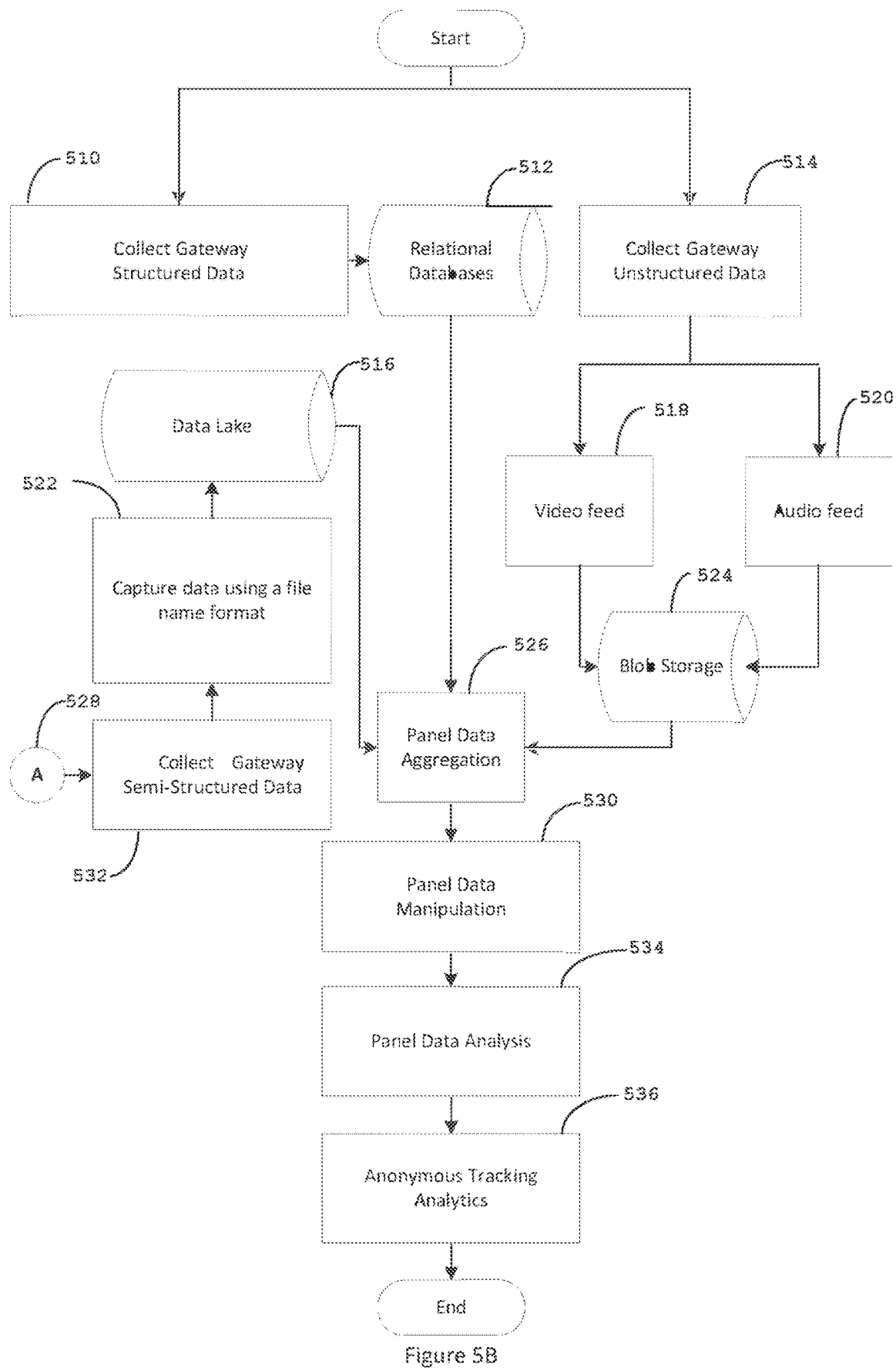
FIG. 5B shows a flowchart of data handling of Bluetooth classic and BLE devices for anonymous tracking analytics.

Referring to FIG. 5B, there is shown a flowchart of data handling of Bluetooth classic and BLE datasets captured in FIG. 5A. More specifically, the flowchart of data handling includes the collection of structured data, which is shown in block 510. Structured data may include parameters specific to the NBHA gateway such as an identifier for the NBHA gateway, a node count, a NBHA gateway status and address (bd_addrs), a Received Signal Strength Indicator (RSSI), a NBHA name, a timestamp, Universally Unique Identifier (UUID). This structured dataset may be saved to a relational database at block 512. By way of example and not of limitation, the relational database may be a MySQL database.

A second data path captures a semi-structured dataset such as the metadata in FIG. 5A, which is represented by connector symbol A 528. At block 532, the NBHA gateway semi-structured dataset is captured using a file name format 522 such as {Namespace}/{EventHub}/{PartitionId}/{Year}/{Month}/{Day}/{Hour}/{Minute}/{Second}. The semi-structured dataset may be saved at data lake 516.

A third data path captures an unstructured dataset at block 514. The unstructured dataset may include a video feed received at block 518 and an audio feed received at block 520, which are stored in Blob storage at block 524.

At block 526, the three data paths are gathered using a panel data aggregation process. At block 530, a panel data manipulation 530 is initiated and a panel data analysis is performed at block 534. These data sets may be used to develop anonymous tracking analytics at block 536, which do not utilize the SIG Protocol because the information captured is wireless leakage emanating from the mobile client devices, e.g., user smartphones.

In addition to the Network Based Hyperlocal Authentication (NBHA) system and method providing a password-less and continuous background authentication and cryptographic operations, which satisfies the core requirement of protecting user privacy and corporate trade secrets. The NBHA system may also be used to anonymously track client devices. In general, anonymous tracking refers to the process of capturing RF emissions with the NBHA gateway. The RF emissions are associated with open network protocols such as Bluetooth Classic and Bluetooth Low Energy. Additionally, the RF emissions may be gathered from Wi-Fi, GSM, LTE, 5G, Near-Field Communication (NFC), Radio-Frequency Identification (RFID), and other such protocols or standards that are used for wireless communications.

When the NBHA system is used for anonymous tracking—the SIG Protocol does not have to be operational. Recall, the SIG Protocol requires integration with a client application that is executed on the client device. Thus, the NBHA system supports anonymously tracking client devices that are not being authenticated by the SIG Protocol.

Thus, when the SIG Protocol is not enabled, the NBHA system can track nefarious/rogue/untrustworthy client devices and trustworthy client devices that are not using the SIG Protocol. To better describe the depth of the NBHA system, an anonymous customer tracking use case is presented that does not engage the SIG Protocol.

Anonymous customer tracking may be used to anonymously improve customer service by anonymously analyzing customer behavior, which preserves user privacy. Anonymously analyzing customer behavior is performed with the customer classification process and event-based A/B testing. The benefit of anonymously analyzing customer behavior is that a property such as a mall or casino can acquire a better understanding of their customers and can obtain real-time feedback from customers regarding the events without the need to have the customer download and engage with a mobile application.

Another use case supported by the NBHA system not using the SIG protocol is a time-based loyalty program. Most loyalty programs are based on transactions. The illustrative systems and methods can award a customer for the time the customer has spent on the property or at a particular location on the property. Once it is determined that the customer is entitled to a loyalty award, the customer's user classification may be used to determine the type of award to deliver to the customer. For example, if the customer has been waiting in the lobby area for one hour and then the customer moves to a restaurant that is completely full, a server may deliver the customer a $20 coupon to reward the customer for having waited one hour for restaurant seating.

Figure 6A:
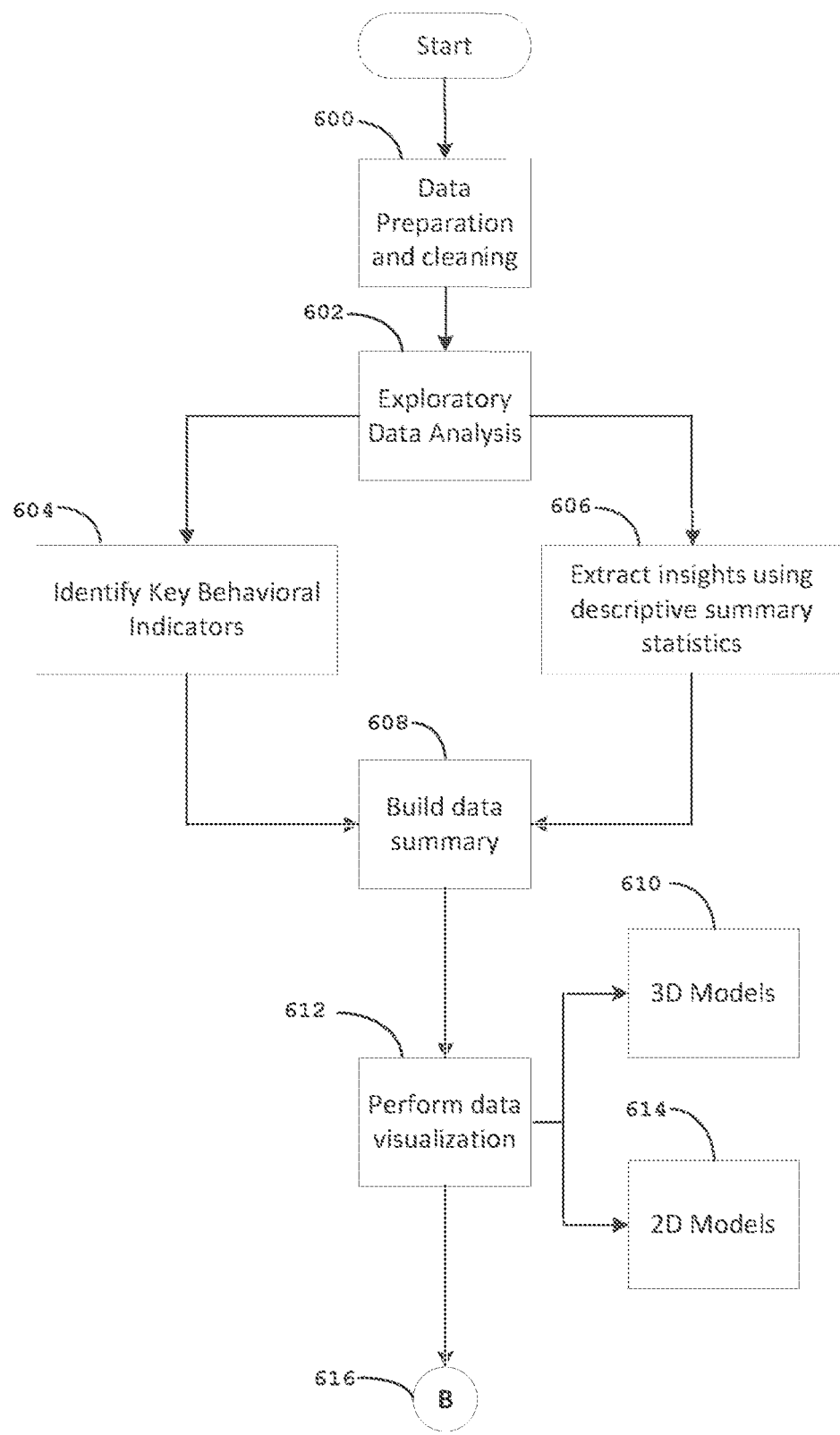
FIG. 6A shows a flowchart for data visualization.

Referring to FIG. 6A, there is shown a flowchart for data visualization for time-based customer loyalty programs. FIG. 6A shows a flowchart for data visualization starting with a data preparation and cleaning process at process block 600. The method then proceeds to an exploratory data analysis at block 602, which identifies Key Behavioral Indicators (KBI) at block 604 and extracts insights using descriptive summary statistics at block 606. Next, the data is aggregated in a data summary at block 608 for data visualization at block 612. The data may be presented in a 3D manner at block 610 and a 2D manner at block 614. Connector symbol B 616 provides data continuity to FIG. 6B.

Figure 6B:
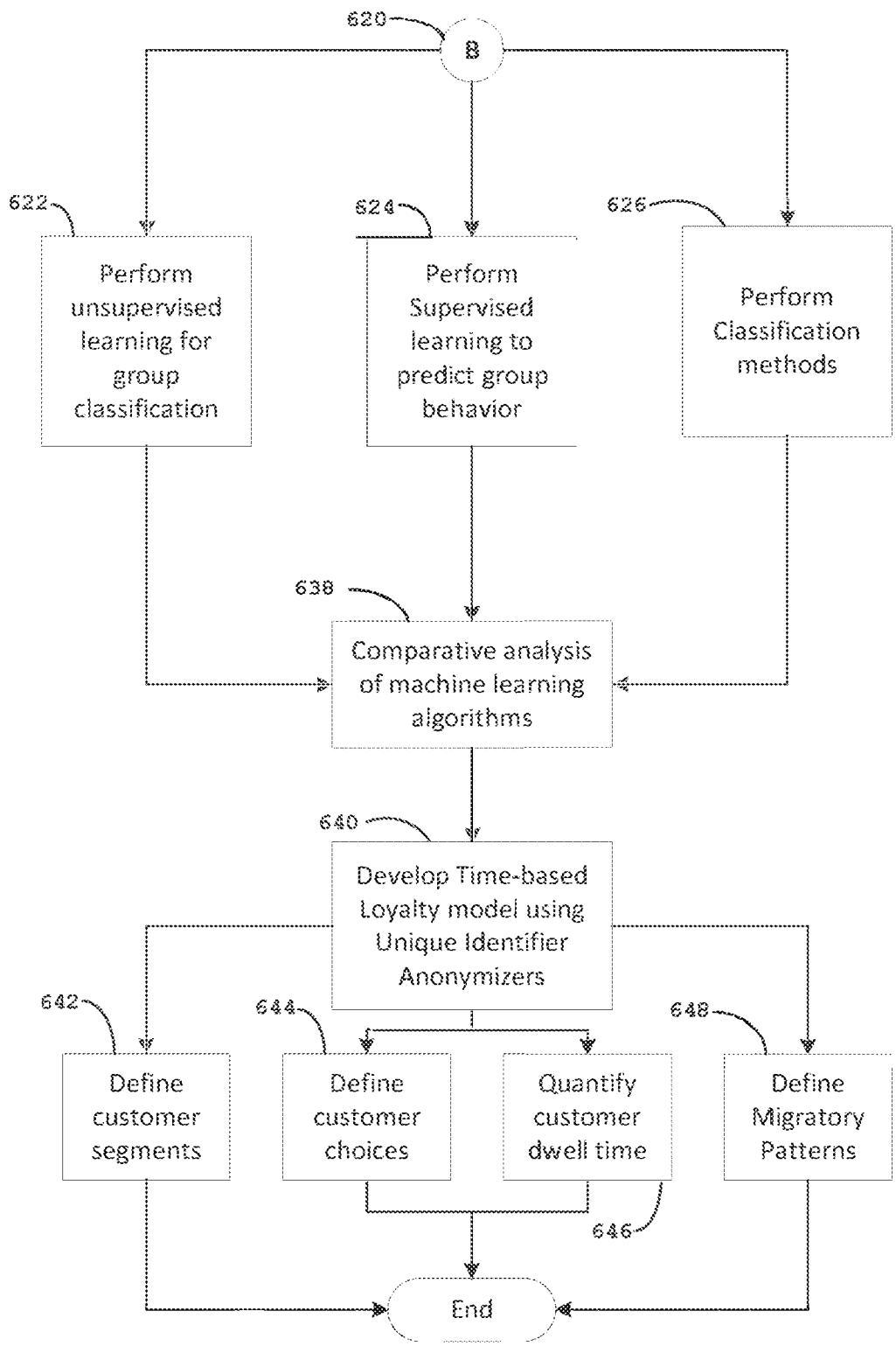
FIG. 6B shows a flowchart for time-based customer loyalty modeling.

Referring to FIG. 6B, there is shown a flowchart for time-based customer loyalty programs. Connector symbol B 620 provides the inputs to perform unsupervised learning for group classification 622 (e.g., party group, gaming group, foodie group). Supervised learning to predict group behavior is performed at process block 624, and other classification methods are performed at process block 626.

The unsupervised learning for group classification including K-means clustering, mean shift, k-mode, and k-prototype algorithms. The supervised learning to predict group behavior may use linear regression, lasso regression, and tree-based regression. Other classification methods include logistics regression, vector machines, decision trees, random forest, and multiclass classification classifiers.

At block 638, a comparative analysis of machine learning algorithms is performed to select the most adept algorithms for the time-based loyalty model using unique identifier anonymizers at block 640. The time-based loyalty model encompassing a process to define customer segments is performed at process block 642. A process to define customer choices is performed at process block 644. A process to quantify customer dwell time is performed at process block 646, and a process to define migratory patterns is performed at process block 648.

Figure 7:
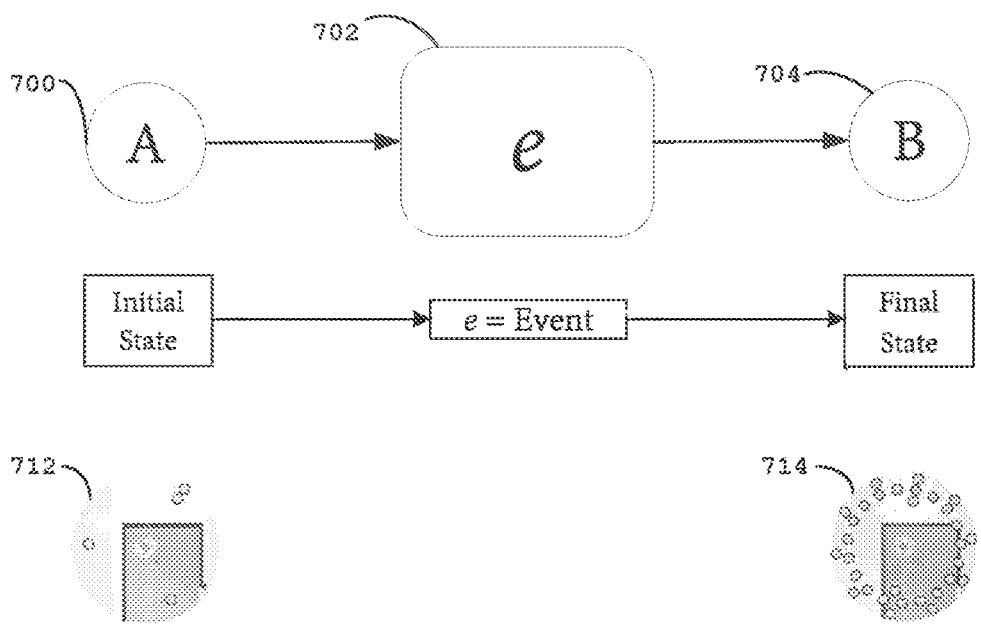
FIG. 7 shows event-based A/B testing for time-based customer loyalty and anonymous tracking analytics.

Referring to FIG. 7, there is shown event-based A/B testing for time-based customer loyalty and anonymous tracking analytics. The flowchart of FIG. 7 illustrates event-based A/B testing through a system and method for time-based customer loyalty and anonymous tracking analytics. An initial state A 700 is modified through an event 702 to produce a final state B 704. For instance, if an event e is introduced in the range of Gateway 1, the crowd size will increase 775% from the initial state 712 because the analytics shows a more significant number of wireless devices in the scanning area 714.

The event based A/B testing provides an objective metric for analyzing a variety of different "events." Note, the term "event" refers to an occurrence, outcome, or activity. For example, video content displayed on digital signage is an "event" that may be subjected to event-based A/B testing by determining the impact of the video content on the migratory customer pattern. A variety of other "events" will readily suggest themselves to persons of ordinary skill in the art having the benefit of this disclosure.

Figure 8:
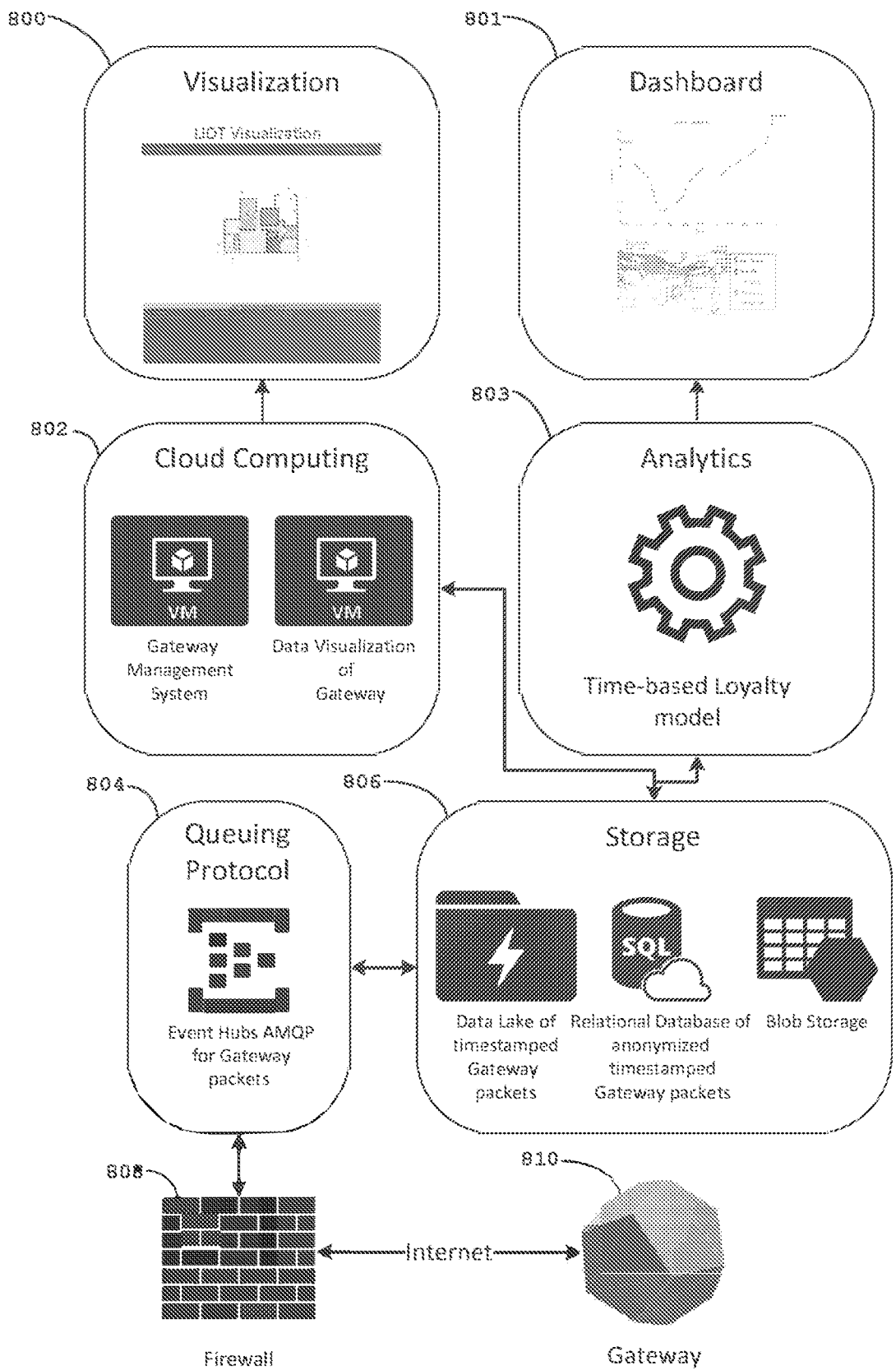
FIG. 8 shows a data flow diagram from a gateway to a data visualization application and an analytics dashboard.

Referring to FIG. 8, there is shown a data flow diagram from a gateway to a data visualization application and an analytics dashboard. The flowchart of FIG. 8 shows a data flow diagram from a NBHA gateway 810 to a data visualization application 800 and an analytics dashboard 801.

The system and method including a firewall 808, a queueing protocol 804, a cloud storage component 806, a cloud computing component 802, and an analytics engine 803. The queuing protocol 804 includes an event hubs AMQP for NBHA gateway packets. Cloud storage 806 includes a data lake of timestamped NBHA gateway packets, a relational database of anonymized timestamped NBHA gateway packets, and blob storage. Cloud computing 802 includes a virtual machine for the NBHA system and a virtual machine for data visualization of the NBHA gateway. An analytics engine is encompassing a time-based behavioral model 803 (e.g., loyalty model).

Figure 9:
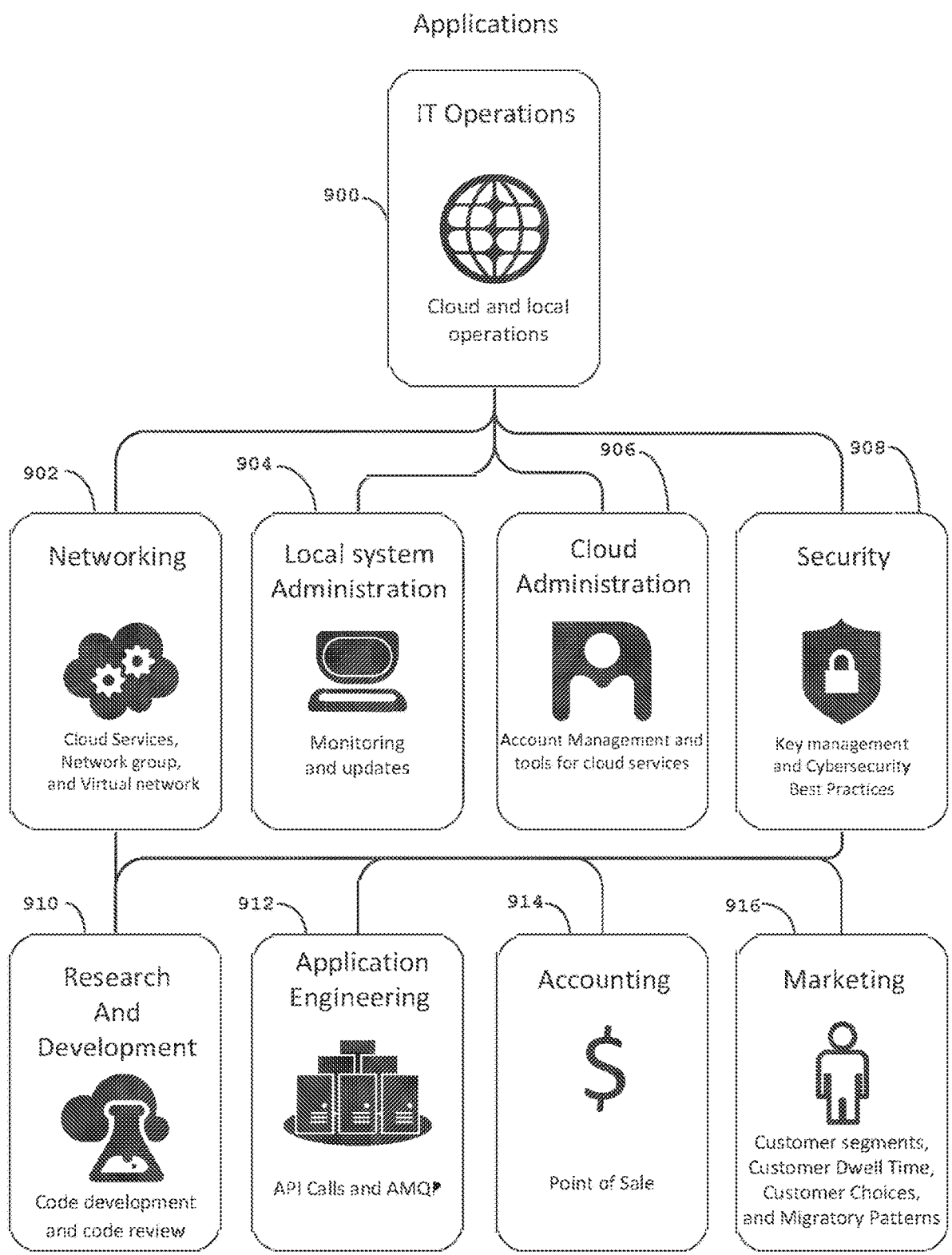
FIG. 9 shows illustrative applications for the Network Based Hyperlocal Authentication (NBHA) system.

Referring to FIG. 9, there is shown illustrative applications for the Network Based Hyperlocal Authentication (NBHA) system. Referring to FIG. 9, there is shown an infrastructure of applications comprising IT operations 900, networking 902, local system administration 904, cloud administration 906, security 908, research and development 910, application engineering 912, accounting 914, and marketing 916. IT operations 900 including cloud and local operations. Networking 902 includes cloud services, network groups, and virtual networks. Local system administration 904 provides monitoring and updates. Cloud administration 906 uses account management and tools for cloud services. Security 908 is used for key management and cybersecurity best practices. Research and development 910 for code development and code review. Application engineering 912 uses Application Programming Interface (API) calls and an Advanced Message Queuing Protocol (AMQP). Accounting 914 tracks sales. Finally, marketing 916 is used to define customer classification, define customer choices, quantify customer dwell time, and define migratory patterns.

Figure 10:
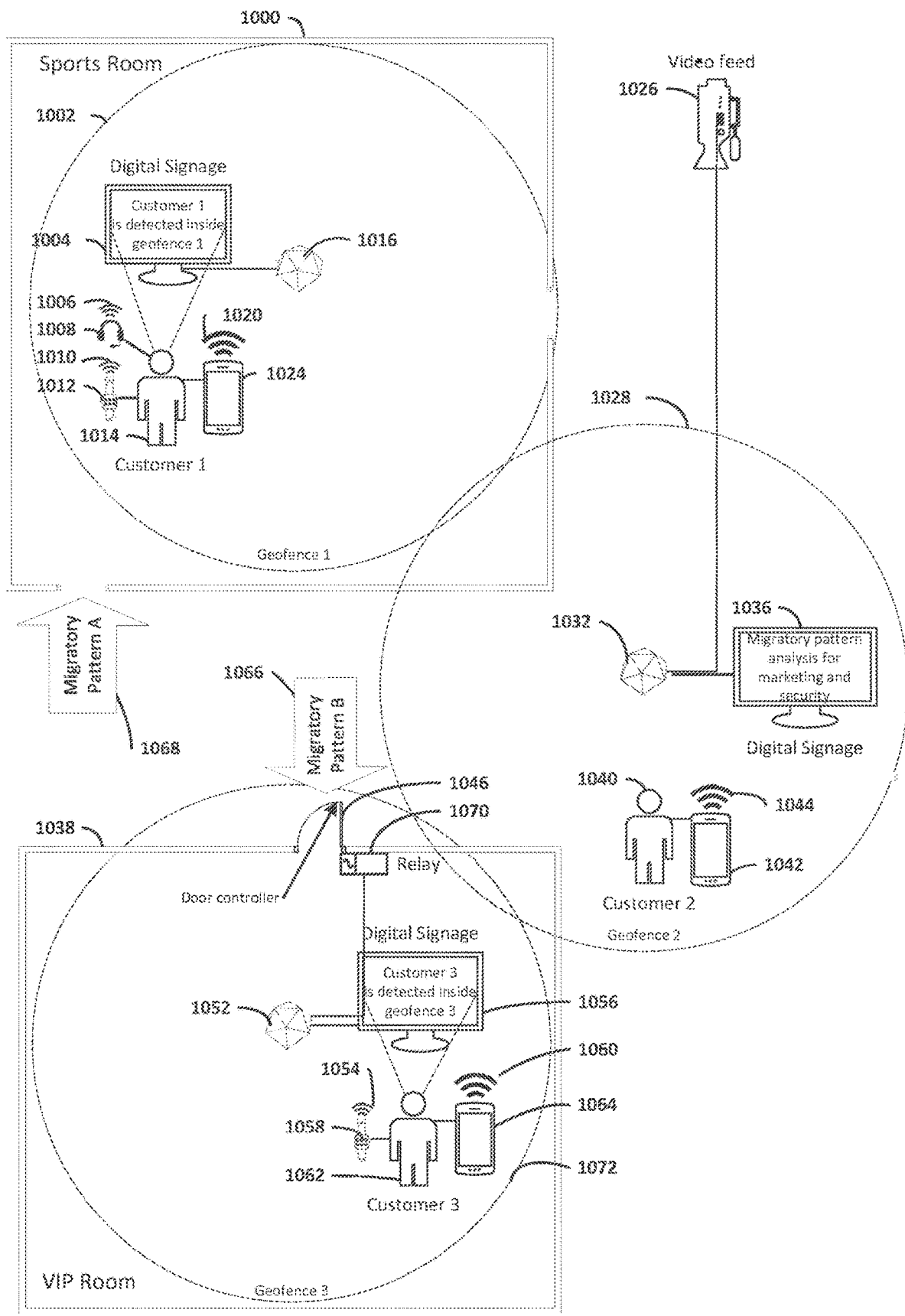
FIG. 10 shows a map layout of gateways in a facility.

Referring to FIG. 10, there is shown a map layout of NBHA gateways in a facility. The illustrative embodiment in FIG. 10 shows a map layout of a plurality of NBHA gateways in a sports room 1000, a VIP Room 1038, and an entrance hall. The architecture is comprised of geofences that include geofence 1002, geofence 1028, and geofence 1072, a digital signage screen 1004, digital signage screen 1036, digital signage screen 1056, NBHA gateway 1016, NBHA gateway 1032, NBHA gateway 1052, a relay 1070 with an interface to a door controller 1046, and a video feed 1026.

Customer 1014, customer 1040, and customer 1062 are associated with mobile device 1024, mobile device 1042, and mobile device 1064, respectively. Each of the mobile devices emits RF signals 1020, RF signals 1044, and RF signals 1060, which correspond to mobile device 1024, mobile device 1042, and mobile device 1064, respectively. Other BLE devices, such as a headset 1008, emit RF signals 1006. Smartwatches 1012 and 1058 emit RF signals 1010 and 1054, respectively.

An illustrative migratory pattern A is captured by arrow 1068 and another illustrative migratory pattern B is captured by arrow 1066. The migratory patterns are used for event-based A/B testing.

Figure 11:
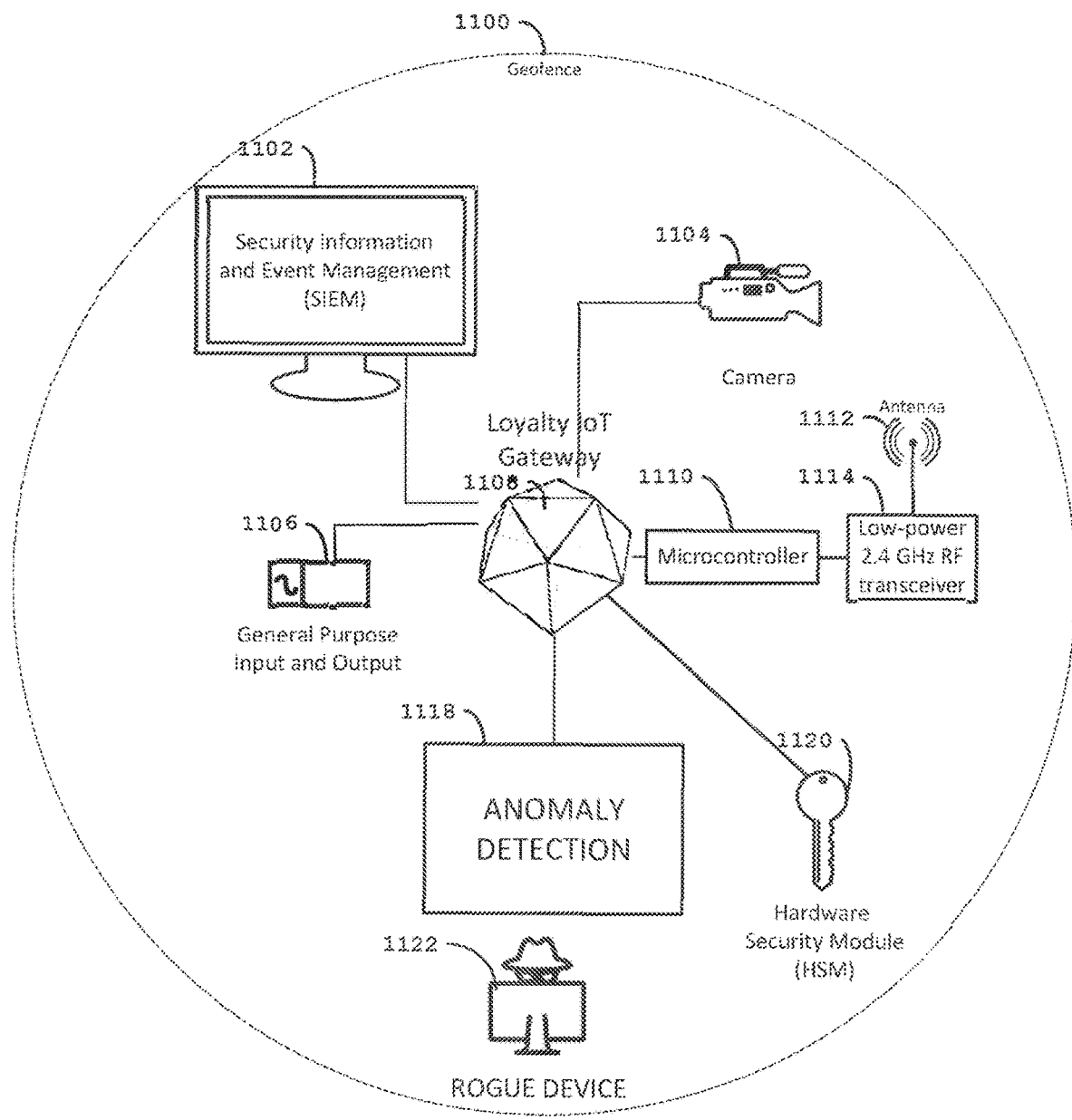
FIG. 11 shows a gateway used for anomaly detection and the detection of rogue devices.

Referring to FIG. 11, there is shown an NBHA gateway being used for anomaly detection and the detection of rogue devices. The NBHA gateway 1108 is communicating with an anomaly detection module 1118, which is running on an illustrative network component, e.g., a server, which is not shown. The anomaly detection module 1118 detects rogue device 1122 within geofence 1100.

By way of example and not of limitation, the NBHA gateway and NBHA system are integrated with a Security Information and Event Management (SIEM) system 1102, a security camera 1104, a microcontroller 1110, a low-power 2.4 GHz RF transceiver 1114, an antenna 1112, a General Purpose Input and Output 1106, and a Hardware Security Module 1120 for anomaly detection.

Figure 12:
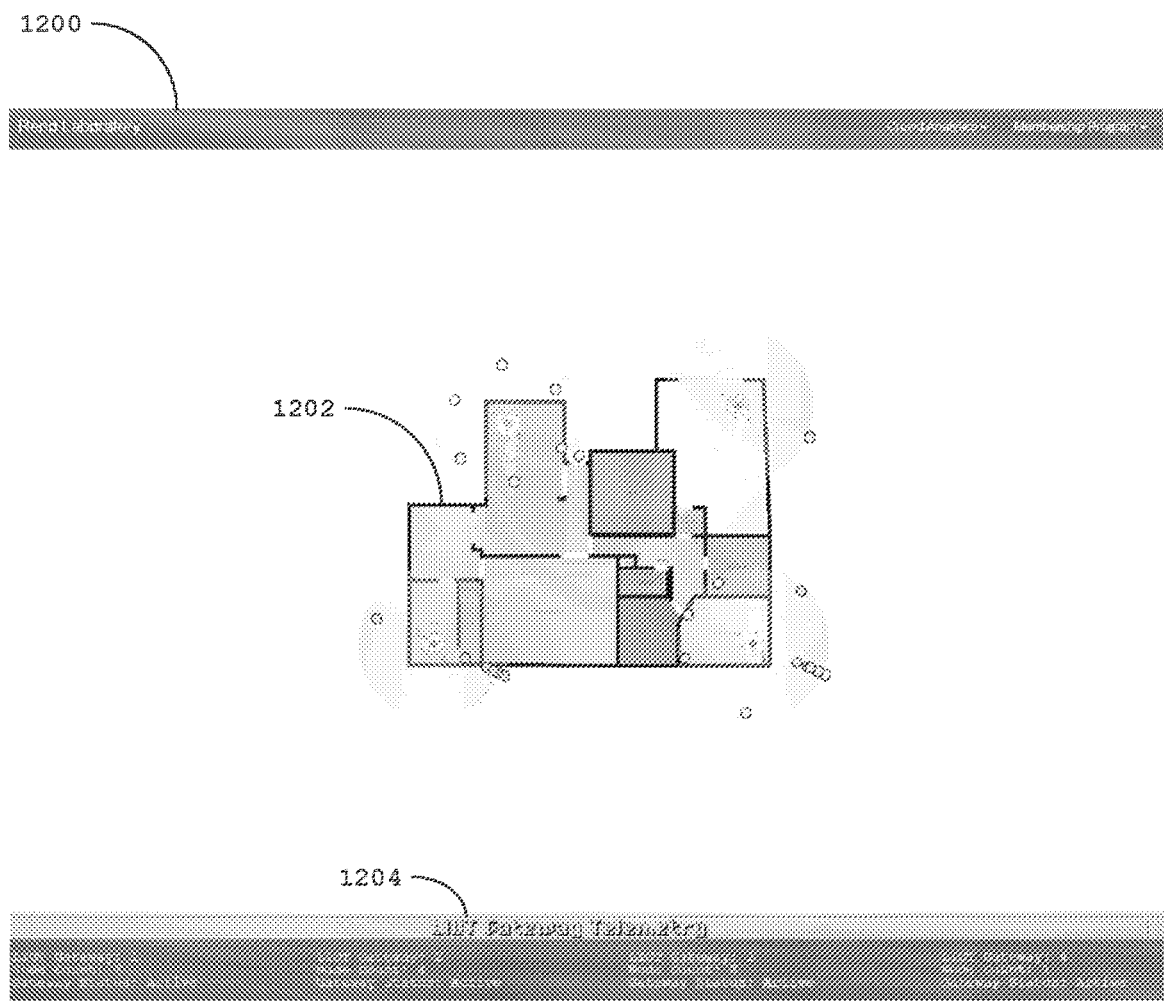
FIG. 12 shows a 2D Visualization using a web browser interface.

Referring to FIG. 12 there is shown a 2D Visualization using a web browser interface. The 2D visualization 1200 includes a web browser interface having a map 1202 and an NBHA gateway telemetry dashboard 1204.

Figure 13:
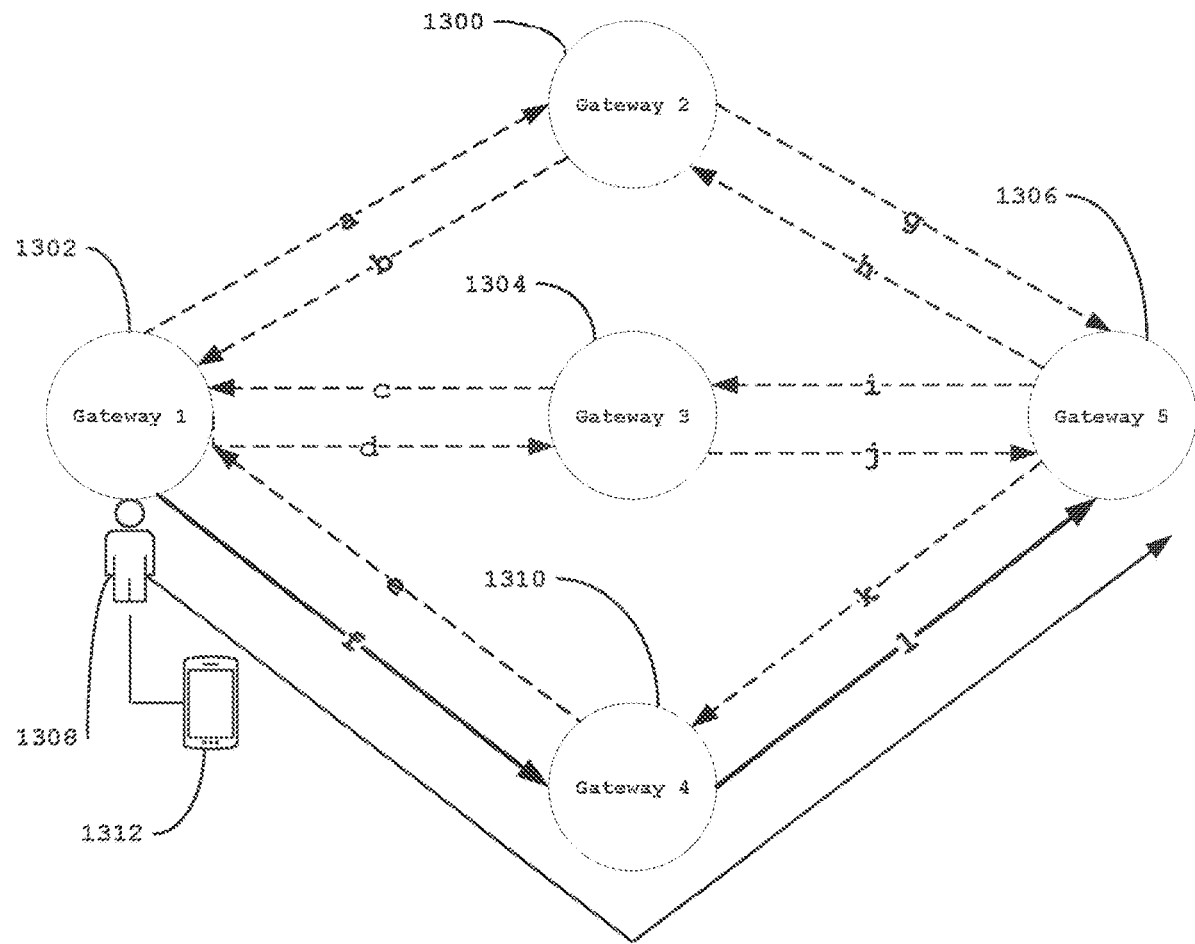
FIG. 13 shows a directed graph and an incidence matrix for calculating migratory patterns.

Referring to FIGS. 13, there is shown a directed graph and an incidence matrix for calculating migratory patterns. The illustrative directed graph includes NBHA gateways 1302, NBHA gateway 1300, NBHA gateway 1304, NBHA gateway 1310, and NBHA gateway 1306 having edges a, b, c, d, e, f, g, h, i, j, k, and l.

An anonymous customer 1308 with a detectable wireless device 1312 following a path [f, l]. In this illustrative embodiment, the incidence matrix follows the rules: 1 if an edge is leading away from a vertex, −1 if an edge is leading to a vertex, and 0 for all others. The incidence matrix is used to calculate migratory patterns.

Figure 14:
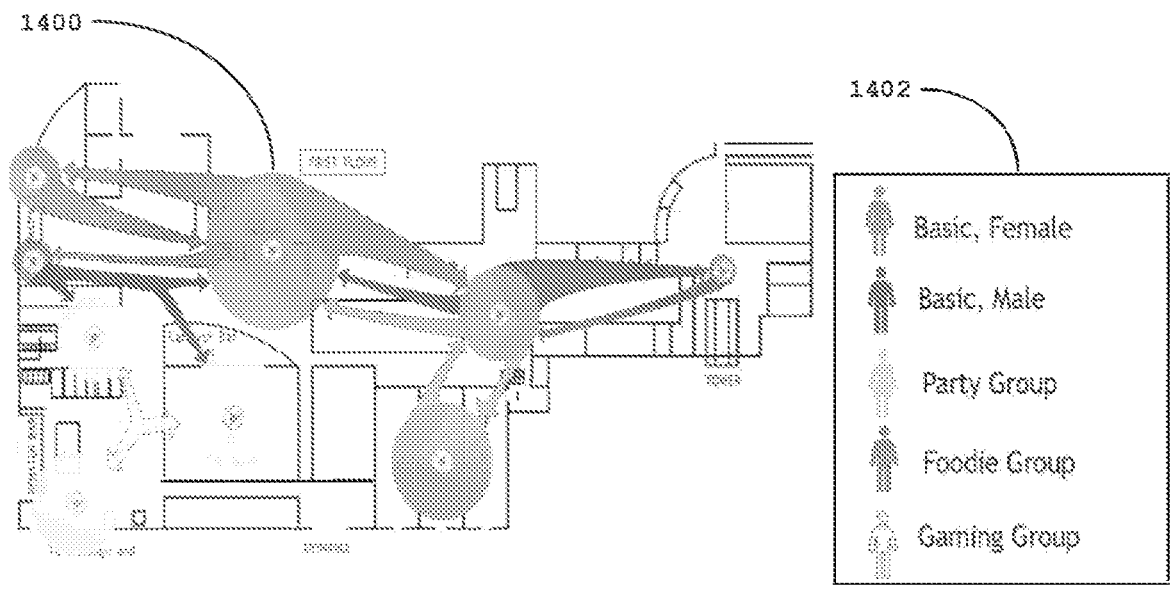
FIG. 14 shows a random dataset of migratory patterns and customer classification.

Referring to FIG. 14, there is shown a random dataset of migratory patterns and customer classification. FIG. 14 illustrates a random dataset of migratory patterns and customer classification. The migratory patterns are presented in a 2D Visualization 1400, and customer classification is provided in a list 1402.

Figure 15:
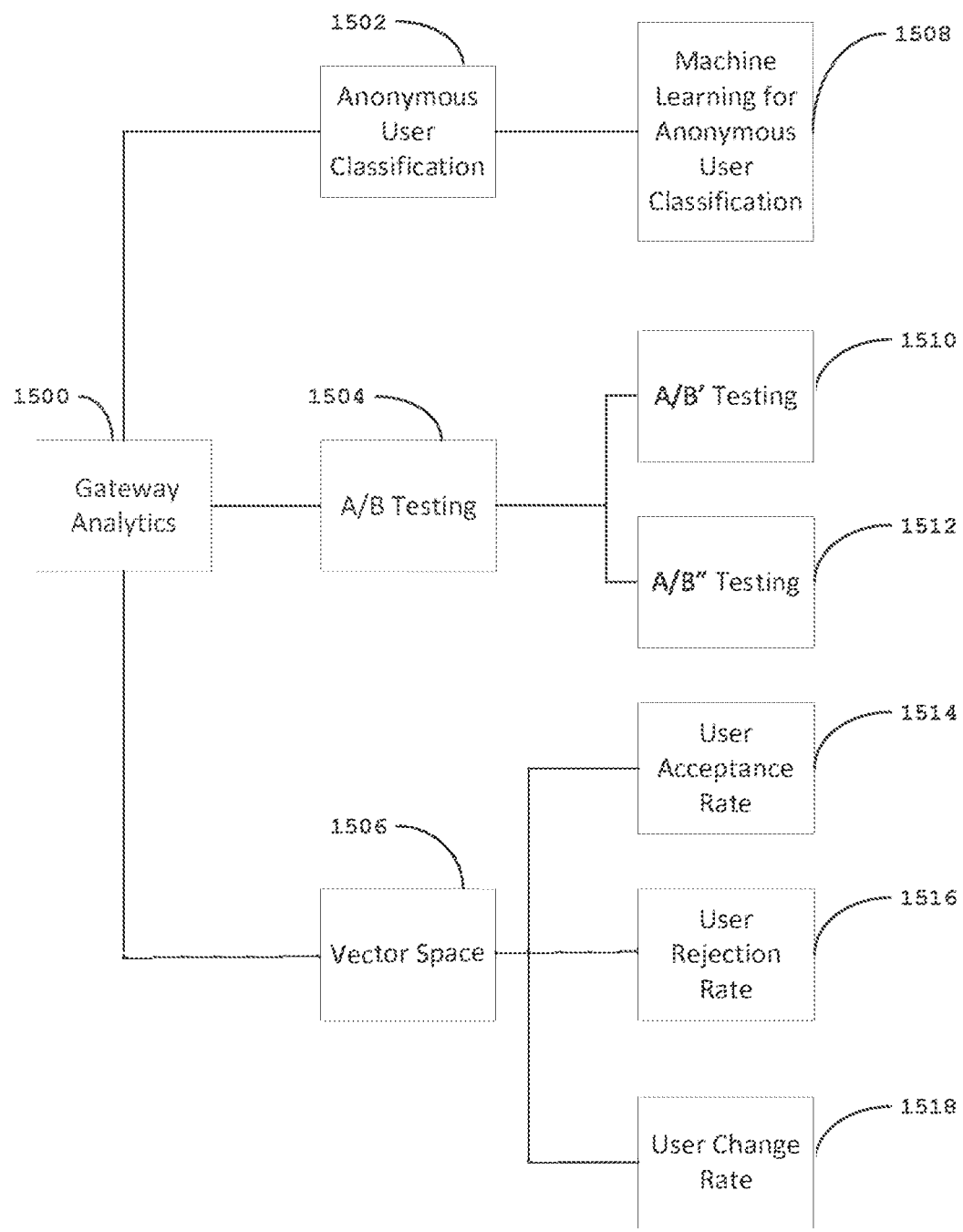
FIG. 15 shows illustrative gateway analytics.

Referring to FIG. 15, there is shown illustrative gateway analytics. FIG. 15 illustrates the analytics 1500 that include anonymous user classification 1502, A/B testing 1504, and vector space 1506. The anonymous user classification includes a machine learning module for anonymous user classification 1508. A/B testing for the general population analytics is performed through an A/B' testing module 1510. Additionally, A/B Testing for user classification is performed through A/B" testing module 1512. The Vector Space 1506 includes user acceptance rate 1514, user rejection rate 1516, and user change rate 1518.

Figure 16:
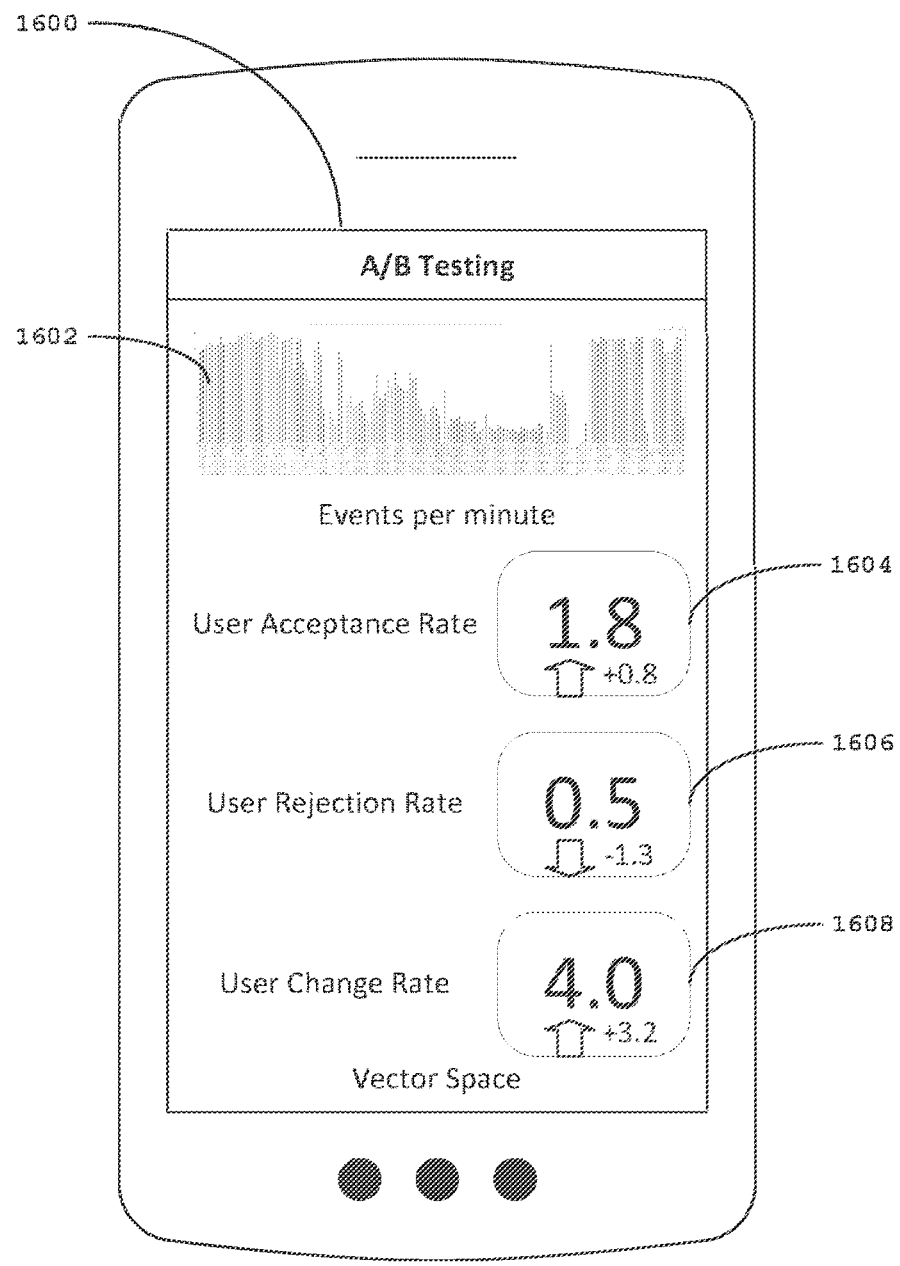
FIG. 16 shows an embodiment of a Graphical User Interface (GUI) for A/B Testing.

Referring to FIG. 16, there is shown an embodiment of a Graphical User Interface (GUI) for A/B Testing. The A/B testing 1600 includes events per minute 1602 and an illustrative vector space for user acceptance rate 1604, user rejection rate 1606, and user change rate 1608. The frequency of the vector space is computed over a period, including per minute, hourly, daily, weekly, monthly, or yearly.

By way of example, the A/B testing results are deemed as important corporate trade secrets visible on a smartphone device that are continuously being authenticated using the SIG Protocol as described above.

Figure 17:
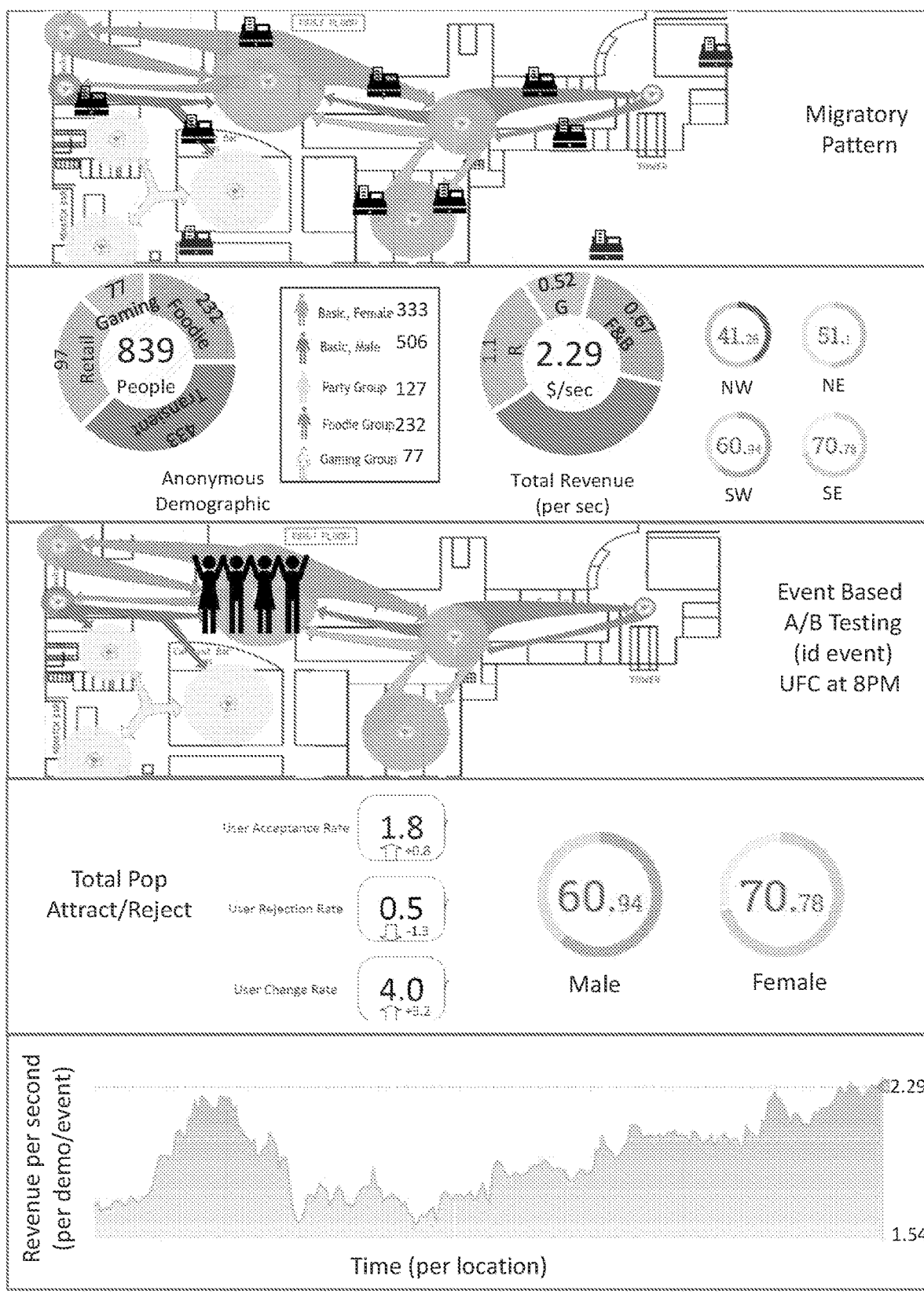
FIG. 17 shows an illustrative dashboard.

Referring to FIG. 17, there is shown an illustrative dashboard. In the top portion of the dashboard, a migratory pattern for a different casino demographics is presented. Below, the migratory pattern is a numerical description of the total number of people associated with each demographic profile. The anonymous patron tracking solution is compared to a financial velocity, which is defined as dollars generated per unit time in a local area and a global area. The third level of the dashboard presents an event time and an event location for the event based A/B testing described above. The attraction (or acceptance as shown in FIG. 17) and rejection is shown in the fourth level. Finally, a total revenue generated per second for a particular area is plotted over time to determine the profitability of different areas within an illustrative casino property.

The systems and methods presented above may integrate with biometric solutions, cameras, and one-time authentication systems and methods. The systems and methods presented above may be integrated with camera based technologies. Note, that cameras cannot see through walls and, typically, require sufficient light to capture quality images. Cameras are also easily detectable. System integration with the NBHA systems enables NBHA gateways to secure specific areas and monitor these spaces for RF leakage from wireless devices that can be easily hidden.

By way of example and not of limitation, NBHA gateways having RGB camera functionality may capture RF emissions from the various smartphones in the secure area and identify RF emissions from unauthorized client devices and authorized client devices. For example, an unauthorized smartphone may be identified, and an associated timestamp may be collected. The timestamp may then be used to identify images of the unauthorized users. Biometric images of the registered users may be accessed to exclude these authenticated users from the RGB camera image(s) having the timestamp associated with the unauthorized smartphone device. The remaining camera images identify the face(s) of the unauthorized user(s). The images of the unauthorized users are then communicated to security personnel so they can locate the unauthorized users and remove them from the secure area.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A network based hyperlocal authentication system that secures communications between a wireless client device and a remote network component, the system comprising:
 a gateway having a gateway short-range wireless transceiver, wherein the gateway receives authentication credentials from the remote network component;
 a client device application, corresponding to the wireless client device having a client device short-range wireless transceiver, wherein the client device application receives authentication credentials from the network component;
 the client device application requests a key from the remote network component;
 the remote network component generates the key for the wireless client device and transmits the key to the gateway;
 the gateway transmits the key to the client device application with the gateway short-range wireless transceiver;
 the client device application, having the key, requests a cryptographic material from the remote network component, and the client device application receives the cryptographic material from the remote network component; and
 the client device application communicates with the remote network component with the key received from the gateway and the cryptographic material received from the network component.

2. The network based hyperlocal authentication system of claim 1 wherein the gateway further includes a scanner that detects one or more client device identifiers and a signal strength for each client device identifier.

3. The network based hyperlocal authentication system of claim 1 wherein the network component includes a database that receives a plurality of RF emissions data from the gateway.

4. The network based hyperlocal authentication system of claim 1 further comprising a message broker associated with the network component, wherein the message broker communicates with a plurality of gateways and a plurality of wireless client devices.

5. The network based hyperlocal authentication system of claim 1 wherein the client device short-range wireless transceiver includes a Bluetooth transceiver; and
 wherein the gateway short-range wireless transceiver includes a gateway Bluetooth transceiver.

6. The network based hyperlocal authentication system of claim 1 wherein the client device short-range wireless transceiver includes a Wi-Fi transceiver; and
 wherein the gateway short-range wireless transceiver includes a gateway Wi-Fi transceiver.

7. The network based hyperlocal authentication system of claim 1 wherein the remote network component is communicatively coupled to each gateway with at least one of a Wide Area Network (WAN) or Local Area Network (LAN).

8. The network based hyperlocal authentication system of claim 1 wherein the key is continuously refreshed by the network component and communicated via the gateway to the wireless client device when the client device application communicates with the remote network component.

9. A network based hyperlocal authentication system to secure communications between a wireless client device and a remote network component, the system comprising:
- a gateway having a short-range wireless transmitter, wherein the gateway receives authentication credentials from the remote network component;
- a wireless client device that receives authentication credentials from the network component;
- the wireless client device having a client device short-range wireless transceiver;
- the wireless client device requests a key from the remote network component;
- the remote network component generates the key for the wireless client device and transmits the key to the gateway;
- the gateway transmits the key to the wireless client device with the gateway short-range wireless transmitter;
- the wireless client device, having the key, requests a cryptographic material from the remote network component, and the wireless client device receives the cryptographic material from the remote network component; and
- the wireless client device communicates with the remote network component with the key received from the gateway and the cryptographic material received from the network component.

10. The network based hyperlocal authentication system of claim 9 wherein the gateway further includes a scanner that detects one or more client device identifiers and a signal strength for each client device identifier.

11. The network based hyperlocal authentication system of claim 9 wherein the network component includes a database that receives a plurality of RF emissions data from the gateway.

12. The network based hyperlocal authentication system of claim 9 further comprising a message broker associated with the network component, wherein the message broker communicates with a plurality of gateways and a plurality of wireless client devices.

13. The network based hyperlocal authentication system of claim 9 wherein the short-range wireless transmitter includes a Bluetooth transmitter and the short-range wireless transceiver includes a Bluetooth transceiver.

14. The network based hyperlocal authentication system of claim 9 wherein the short-range wireless transmitter includes a Wi-Fi transmitter and the short-range wireless transceiver includes a Wi-Fi transceiver.

15. The network based hyperlocal authentication system of claim 9 wherein the remote network component is communicatively coupled to each gateway with at least one of a Wide Area Network (WAN) or Local Area Network (LAN).

16. A network based hyperlocal authentication method to secure communications between a wireless client device and a remote network component, the method comprising:
- receiving, by a gateway that includes a gateway short-range wireless transceiver, authentication credentials from the remote network component;
- receiving, by the wireless client device, authentication credentials from the network component, wherein the wireless client device includes a client device short-range wireless transceiver;
- requesting, by the wireless client device, a key from the remote network component;
- generating, by the remote network component, the key for the wireless client device;
- transmitting, by the remote network component, the key to the gateway;
- receiving, by the gateway, the key from the remote network component;
- transmitting, by the gateway, the key to the wireless client device with the gateway short-range wireless transceiver;
- requesting, at the wireless client device, a cryptographic material from the remote network component;
- receiving, at the wireless client device, the cryptographic material from the remote network component;
- enabling the wireless client device to communicate with the remote network component using the key and the cryptographic material received from the network component.

17. The network based hyperlocal authentication method of claim 16 wherein the gateway further includes a scanner that detects one or more client device identifiers and a signal strength for each client device identifier.

18. The network based hyperlocal authentication method of claim 16 wherein the network component includes a database that receives a plurality of RF emissions data from the gateway.

19. The network based hyperlocal authentication method of claim 16 wherein the client device short-range wireless transceiver includes a Bluetooth transceiver and the gateway short-range wireless transceiver includes a gateway Bluetooth transceiver.

20. The network based hyperlocal authentication method of claim 16 wherein the client device short-range wireless transceiver includes a Wi-Fi transceiver and the gateway short-range wireless transceiver includes a gateway Wi-Fi transceiver.

* * * * *